United States Patent
Lee et al.

(10) Patent No.: US 10,671,258 B2
(45) Date of Patent: Jun. 2, 2020

(54) ELECTRONIC DEVICE HAVING HOLE AREA AND METHOD OF CONTROLLING HOLE AREA THEREOF

(71) Applicant: Samsung Electronics Co., Ltd., Gyeonggi-do (KR)

(72) Inventors: Jongmoo Lee, Seoul (KR); Seungmin Choi, Gyeonggi-do (KR); Daehyun Kim, Gyeonggi-do (KR); Soyoung Kim, Gyeonggi-do (KR); Minsik Kim, Gyeonggi-do (KR); Geonsoo Kim, Gyeonggi-do (KR); Jinwan An, Daegu (KR); Jiwoo Lee, Gueongsangbuk-do (KR); Hyunsuk Choi, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 245 days.

(21) Appl. No.: 15/794,234

(22) Filed: Oct. 26, 2017

(65) Prior Publication Data
US 2018/0121067 A1    May 3, 2018

(30) Foreign Application Priority Data

Oct. 28, 2016 (KR) .......... 10-2016-0141964

(51) Int. Cl.
  *G06F 3/0484* (2013.01)
  *G06F 1/16* (2006.01)
  *G06F 3/0488* (2013.01)

(52) U.S. Cl.
  CPC ........ *G06F 3/04845* (2013.01); *G06F 1/1643* (2013.01); *G06F 3/0488* (2013.01);
  (Continued)

(58) Field of Classification Search
  CPC ................... G06F 3/04842; G06F 2203/04803
  (Continued)

(56) References Cited

U.S. PATENT DOCUMENTS 6,118,427 A * 9/2000 Buxton ................ G06F 3/0481
                                                345/629
6,564,263 B1 * 5/2003 Bergman ................ G06K 9/00
                                                709/231

(Continued)

FOREIGN PATENT DOCUMENTS

EP    2 192 475 A2   6/2010
EP    3 046 016 A1   7/2016
(Continued)

OTHER PUBLICATIONS

Jason Cipriani, "HTC 10 Review: Its Newest Smartphone Isn't a Perfect 10, but Its Close", available on May 16, 2016, available at <<https://fortune.com/longform/htc-10-smartphone-review/>>, 14 pages (Year: 2016).*

(Continued)

*Primary Examiner* — Daniel Rodriguez
(74) *Attorney, Agent, or Firm* — Cha & Reiter, LLC

(57) ABSTRACT

An electronic device and method are disclosed herein. The electronic device includes a housing comprising, a touch screen, and at least one processor electrically connected coupled to the display. The processor implements the method including defining a main area and an extension area of a display of the electronic device, detecting selecting selection of a displayed content, detecting by a processor whether a characteristic of a portion of the content disposed along an edge of the content is equal to or less than a threshold, and enlarging the selected displayed content for (Continued)

display on the main area and extending to the extension area based on whether the characteristic of the portion is equal to or less than the threshold.

20 Claims, 26 Drawing Sheets

(52) U.S. Cl.
CPC ...... *G06F 3/04842* (2013.01); *G06F 3/04883* (2013.01); *G06F 2203/04803* (2013.01); *G06F 2203/04806* (2013.01)

(58) Field of Classification Search
USPC .......................................................... 715/863
See application file for complete search history.

(56) References Cited

U.S. PATENT DOCUMENTS

| | | | | |
|---|---|---|---|---|
| 9,389,703 | B1* | 7/2016 | Olsen | G06F 3/0346 |
| 10,304,408 | B2* | 5/2019 | Yu | G06T 11/001 |
| 2005/0044500 | A1* | 2/2005 | Orimoto | G06F 3/0481 |
| | | | | 715/706 |
| 2008/0307342 | A1* | 12/2008 | Furches | G06T 11/00 |
| | | | | 715/764 |
| 2010/0137027 | A1 | 6/2010 | Kim | |
| 2013/0125588 | A1* | 5/2013 | Kladias | C03B 23/0235 |
| | | | | 65/103 |
| 2013/0147727 | A1* | 6/2013 | Lee | G06F 3/0412 |
| | | | | 345/173 |
| 2013/0271447 | A1* | 10/2013 | Setlur | G06F 1/1626 |
| | | | | 345/418 |
| 2014/0055367 | A1* | 2/2014 | Dearman | G06F 3/0488 |
| | | | | 345/173 |
| 2014/0059478 | A1* | 2/2014 | Dearman | G06F 3/04886 |
| | | | | 715/781 |
| 2014/0075324 | A1* | 3/2014 | Howard | H04L 12/18 |
| | | | | 715/738 |
| 2014/0085339 | A1* | 3/2014 | Brady | G06F 3/0487 |
| | | | | 345/649 |
| 2014/0139736 | A1* | 5/2014 | McCoy | H04N 7/0122 |
| | | | | 348/445 |
| 2014/0168135 | A1* | 6/2014 | Saukko | G06F 1/1684 |
| | | | | 345/174 |
| 2014/0289668 | A1* | 9/2014 | Mavrody | G06F 3/04886 |
| | | | | 715/781 |
| 2014/0355179 | A1* | 12/2014 | Little | G06F 1/16 |
| | | | | 361/679.01 |
| 2014/0362257 | A1* | 12/2014 | Viljamaa | H04N 5/2251 |
| | | | | 348/231.99 |
| 2015/0170606 | A1* | 6/2015 | Jureidini | G09G 5/026 |
| | | | | 345/592 |
| 2016/0048316 | A1 | 2/2016 | Bae et al. | |
| 2016/0077793 | A1 | 3/2016 | Disano et al. | |
| 2016/0117849 | A1* | 4/2016 | Qian | G06T 11/001 |
| | | | | 345/593 |
| 2016/0170511 | A1* | 6/2016 | Dighde | G06F 3/041 |
| | | | | 345/173 |
| 2016/0202865 | A1* | 7/2016 | Dakin | G06F 3/0485 |
| | | | | 715/784 |
| 2016/0210034 | A1 | 7/2016 | Zhu et al. | |
| 2016/0210111 | A1* | 7/2016 | Kraft | H04R 1/1041 |
| 2016/0239992 | A1* | 8/2016 | Heo | G06T 11/60 |
| 2016/0253047 | A1* | 9/2016 | Kim | G06F 3/0487 |
| | | | | 715/764 |
| 2016/0259544 | A1* | 9/2016 | Polikarpov | G06F 3/0412 |
| 2016/0378334 | A1* | 12/2016 | Liu | G06F 3/0416 |
| | | | | 715/794 |
| 2017/0199596 | A1* | 7/2017 | Wang | G02F 1/1333 |
| 2017/0357346 | A1* | 12/2017 | Wang | G06F 3/044 |
| 2018/0039348 | A1* | 2/2018 | Schwager | G06F 3/041 |
| 2018/0150433 | A1* | 5/2018 | Sowden | G06F 3/0481 |
| 2018/0300005 | A1* | 10/2018 | Yeo | B32B 7/12 |
| 2019/0251708 | A1* | 8/2019 | Furches Cranfill | G06F 3/04845 |

FOREIGN PATENT DOCUMENTS

| | | |
|---|---|---|
| JP | 2006-166146 A | 6/2006 |
| KR | 10-2009-0033949 A | 4/2009 |
| KR | 10-2010-0060795 A | 6/2010 |

OTHER PUBLICATIONS

European Search Report dated Feb. 23, 2018.

\* cited by examiner

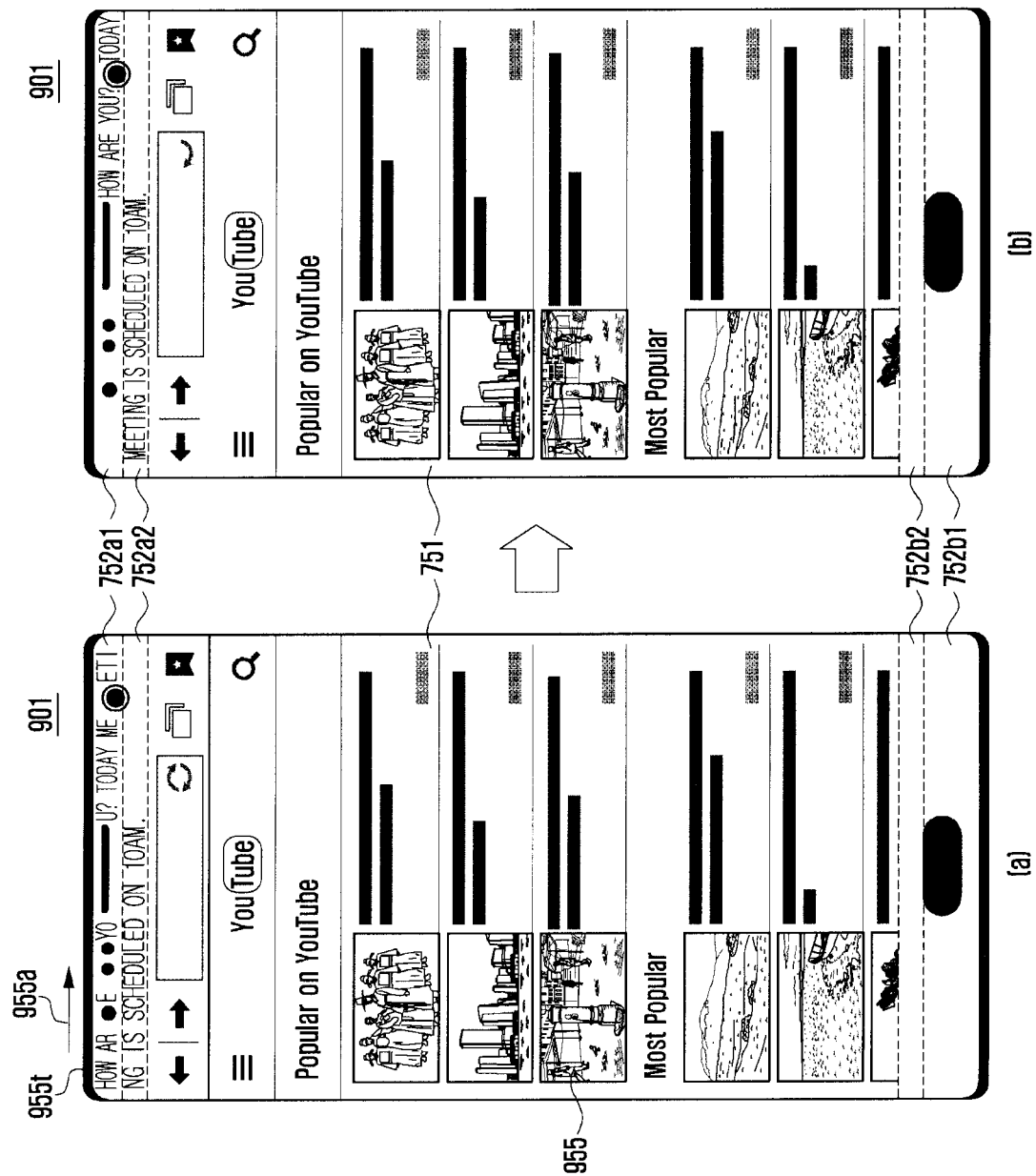

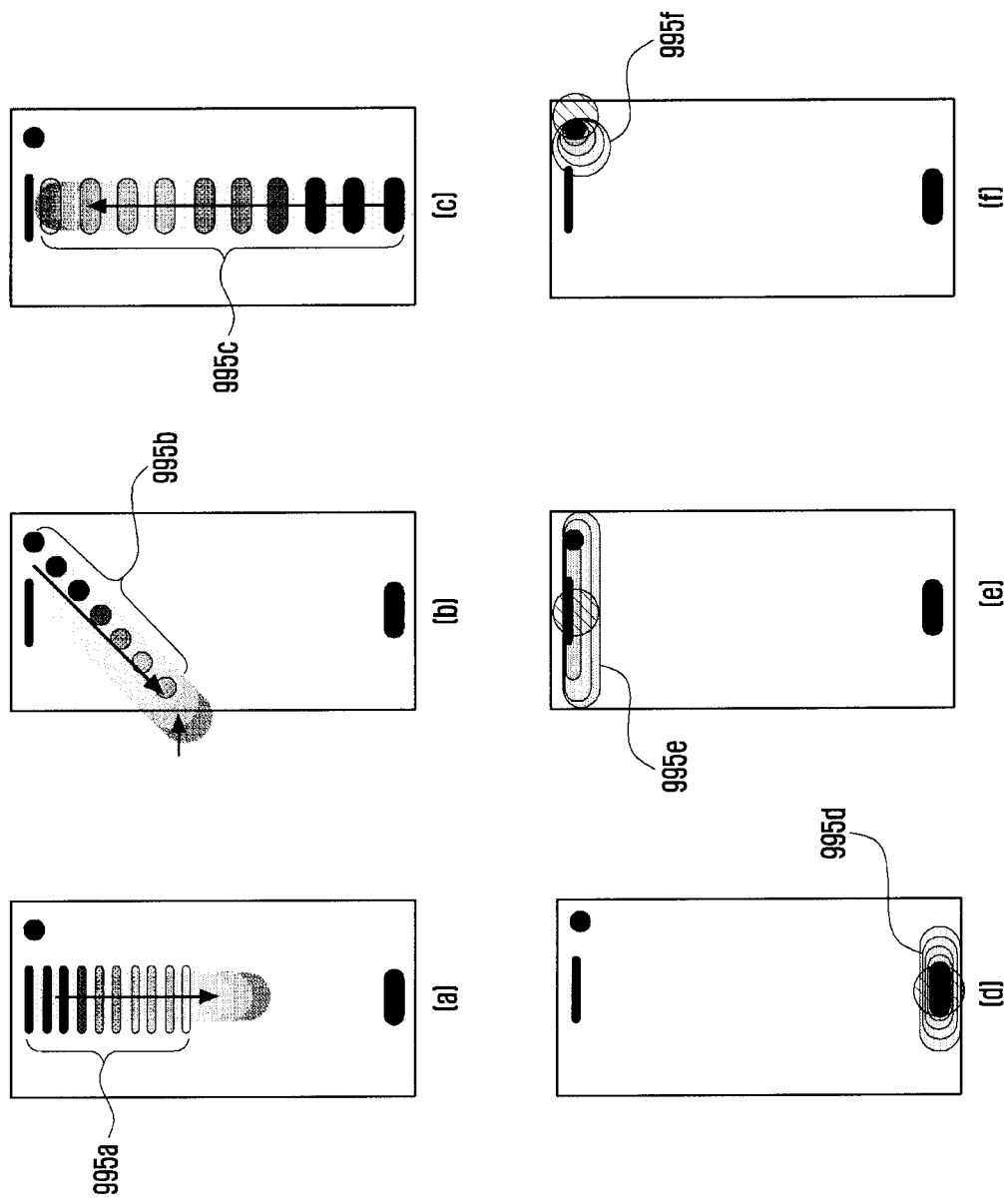

US 10,671,258 B2

ELECTRONIC DEVICE HAVING HOLE AREA AND METHOD OF CONTROLLING HOLE AREA THEREOF

CLAIM OF PRIORITY

This application claims the benefit under 35 U.S.C. § 119(a) of Korean patent application filed on Oct. 28, 2016 in the Korean Intellectual Property Office and assigned Serial number 10-2016-0141964, the entire disclosure of which is hereby incorporated by reference.

TECHNICAL FIELD

The following example embodiments relate to an electronic device having a hole area and a method of controlling a hole area thereof.

BACKGROUND

With the development of technology, electronic devices have advanced to provide various services and functions through multitasking and execution of various applications, beyond basic functions such as communication and data transmission.

Electronic devices having a frontal display screen has a gradually increase in screen size in order to provide better service to a user through a large viewing area. The screen size is limited by placement of other components, such as a camera, receiver, and sensor disposed at an upper end portion of the front surface of the device, or a home button disposed at a lower end portion of the front surface of the device.

SUMMARY

The present disclosure has been made in view of the above problem and provides an electronic device having a hole area and a method of controlling a hole area thereof that can enlarge a content through a display having a main area and an extension area.

In accordance with an aspect of the present disclosure, a method in an electronic device includes: defining a main area and an extension area of a display of the electronic device, detecting selecting selection of a displayed content, detecting by a processor whether a characteristic of a portion of the content disposed along an edge of the content is equal to or less than a threshold, and enlarging the selected displayed content for display on the main area and extending to the extension area based on whether the characteristic of the portion is equal to or less than the threshold.

In accordance with another aspect of the present disclosure, an electronic device includes: a housing comprising including a first surface facing in a first direction and a second surface facing in a second direction opposite to the first direction, a touch screen display disposed between the first surface and the second surface, such that a portion of the touch screen is exposed through the first surface, and having the touch screen display including a main area and an extension area, the extension area including at least one opening, and at least one hole area positioned at the extension area, at least one processor electrically connected coupled to the display, configured to: detect selection of a content displayed on the touch screen and detecting whether a characteristic of a portion of the content disposed along an edge of the content is equal to or less than a threshold, display the selected content on the main area and extending to the extension area when the characteristic is equal to or less than the threshold, and excluding the selected content from display in the extension area when the characteristic is greater than the threshold.

BRIEF DESCRIPTION OF THE DRAWINGS

The above features present disclosure will be more apparent from the following detailed description in conjunction with the accompanying drawings, in which:

FIG. 9A, FIG. 9B, FIG. 9C, FIG. 9D, FIG. 9E, FIG. 9F, FIG. 9G, FIG. 9H FIG. 9I, FIG. 9J and FIG. 9K are diagrams illustrating a method of controlling an electronic device according to an example embodiment;

FIG. 11A, FIG. 11B, FIG. 11C, FIG. 11D, FIG. 11E and FIG. 11F are diagrams illustrating a method of controlling an electronic device according to another example embodiment.

DETAILED DESCRIPTION

Figure 1:
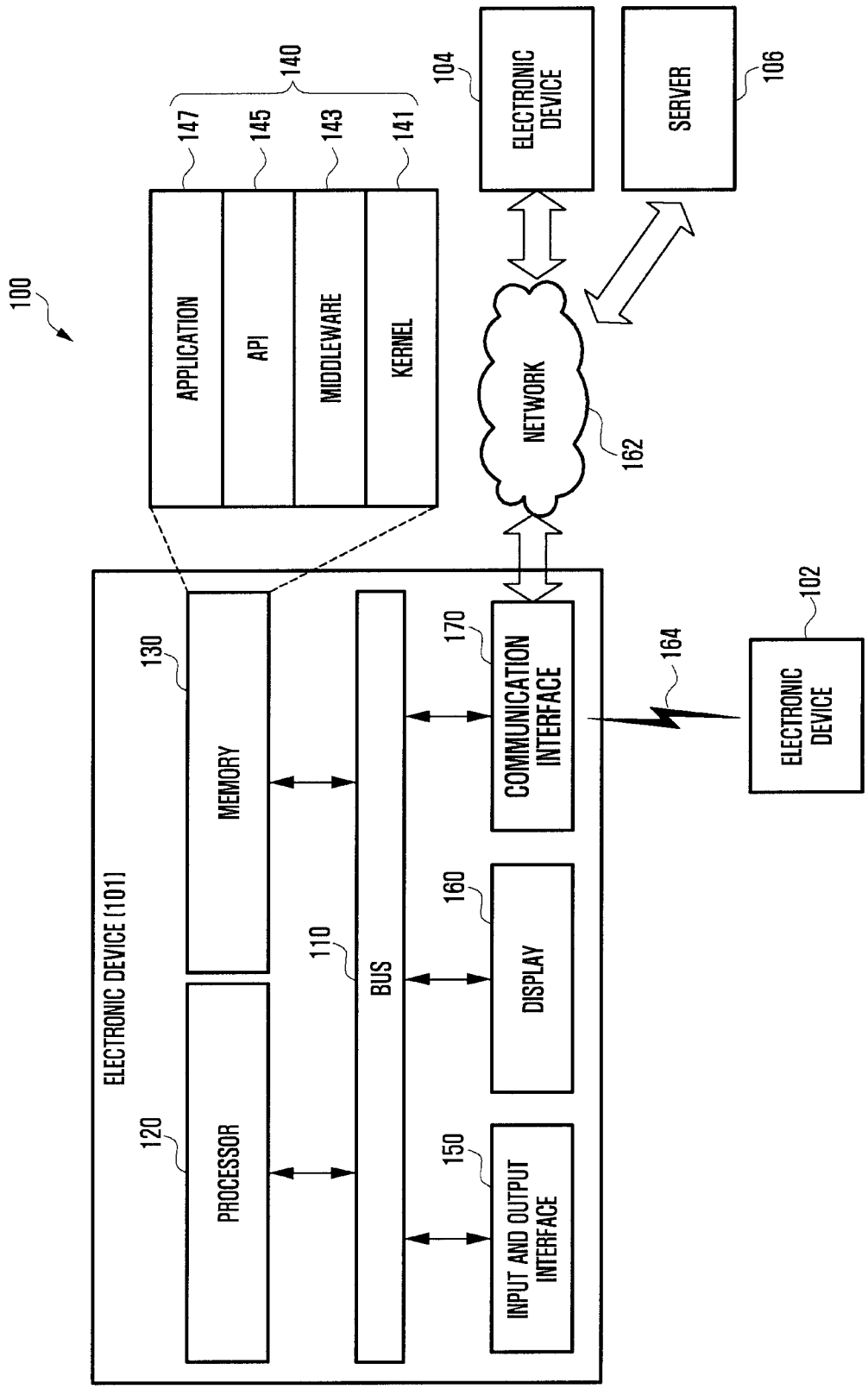
FIG. 1 is a diagram illustrating a network environment including an electronic device according to various example embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely example. Accordingly, those of ordinary skill in the art will recognize that various changes and modifications of the various embodiments described herein can be made without departing from the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

In this disclosure, the expression "A or B" or "at least one of A and/or B" may include A, may include B, or may include both A and B. Expressions including ordinal numbers, such as "first" and "second," etc., may modify various elements. However, the above expressions do not limit the sequence and/or importance of the elements and are used merely for the purpose to distinguish an element from the other elements. In case where a certain (e.g., the first) element is referred to as being "connected" or "accessed" (functionally or communicatively) to other (e.g., the second) element, it should be understood that the element is connected or accessed directly to the other element or through another (e.g., the third) element. In this disclosure, the expression "configured to" may be used, depending on situations, interchangeably with "adapted to", "having the ability to", "modified to", "made to", "capable of", or "designed to". In some situations, the expression "device configured to" may mean that the device may operate with other device(s) or other component(s). For example, the expression "processor configured to perform A, B and C" may mean a dedicated processor (e.g., an embedded processor) for performing the above operations, or a general-purpose processor (e.g., central processing unit (CPU) or an application processor (AP)) capable of performing the above operations by executing one or more software programs stored in a memory device. An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, and a wearable device. For example, a wearable device may include at least one of an accessory type (e.g., a watch, a ring, a bracelet, an anklet, a necklace, an electronic accessory, eyeglasses, contact lenses, or a head-mounted device (HMD)), a textile or cloth assembled type (e.g., electronic clothing), a body attached type (e.g., a skin pad or tattoo), and a body transplant circuit. In some embodiments, an electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In various embodiments of the present disclosure, an electronic device may include at least one of various medical devices (e.g., magnetic resonance angiography (MRA), magnetic resonance imaging (MRI), computed tomography (CT), a scanning machine, an ultrasonic wave device, etc.), a navigation device, a global navigation satellite system (GNSS), an event data recorder (EDR), a flight data recorder (FDR), a vehicle infotainment device, an electronic equipment for a ship (e.g., navigation equipment for a ship, gyrocompass, etc.), avionics, a security device, a head unit or device for a vehicle, an industrial or home robot, a drone, an automated teller machine (ATM), a point of sales (POS), and various Internet of things (IoT) devices (e.g., a lamp, various sensors, a sprinkler, a fire alarm, a thermostat, a street light, a toaster, athletic equipment, a hot water tank, a heater, a boiler, etc.). According to a certain embodiment, an electronic device may include at least one of furniture, a portion of a building/structure or car, an electronic board, an electronic signature receiving device, a projector, and various measuring meters (e.g., a water meter, an electric meter, a gas meter, a wave meter, etc.). In various embodiments, an electronic device may be flexible or a combination of two or more of the aforementioned devices. An electronic device according to various embodiments of this disclosure is not limited to the aforementioned devices. In this disclosure, the term a user may refer to a person who uses an electronic device, or a machine (e.g., an artificial intelligence device) which uses an electronic device.

FIG. 1 is a block diagram illustrating a network environment 100 including therein an electronic device 101 in accordance with various embodiments of the present disclosure.

Referring to FIG. 1, the electronic device 101 may include, but is not limited to, a bus 110, a processor 120, a memory 130, an input/output interface 150, a display 160, and a communication interface 170. The bus 110 may be a circuit designed for connecting the above-discussed elements and communicating data (e.g., a control message) between such elements. The processor 120 may receive commands from the other elements (e.g., the memory 130, the input/output interface 150, the display 160, or the communication interface 170, etc.) through the bus 110, interpret the received commands, and perform the arithmetic or data processing based on the interpreted commands. The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be implemented by software, firmware, hardware, and any combination thereof.

The kernel 141, as illustrated in FIG. 1, may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147. The API 145 is an interface through which the application 147 is capable of controlling a function provided by the kernel 141 or the middleware 143, and may include, for example, at least one interface or function for file control, window control, image processing, character control, or the like. The input/output interface 150 may deliver commands or data, entered by a user through an input/output unit or device (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may establish communication between the electronic device 101 and any external device (e.g., the first external electronic device 102, the second external electronic device 104, or the server 106). For example, the communication interface 170 may be connected with a network 162 through wired or wireless communication 164 and thereby communicate with any external device (e.g., the second external electronic device 104, or the server 106).

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a global navigation satellite system (GLONASS), a BeiDou navigation satellite system (hereinafter, referred to as "BeiDou"), and Galileo (European global satellite-based navigation system). Hereinafter, the "GPS" may be interchangeably used with the "GNSS" in the present disclosure.

The wired communication may include, but not limited to, at least one of universal serial bus (USB), high definition multimedia interface (HDMI), recommended standard 232 (RS-232), or plain old telephone service (POTS). The network 162 includes, as a telecommunications network at least one of a computer network (e.g., local area network (LAN) or wide area network (WAN)), the internet, and a telephone network. The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102 or 104 or the server 106. In the case where the electronic device 101 performs a certain function or service automatically or in response to a request, the electronic device 101 may request at least a portion of functions related to the function or service from another electronic device 102 or 104 or the server 106 instead of or in addition to performing the function or service for itself. The other electronic device 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
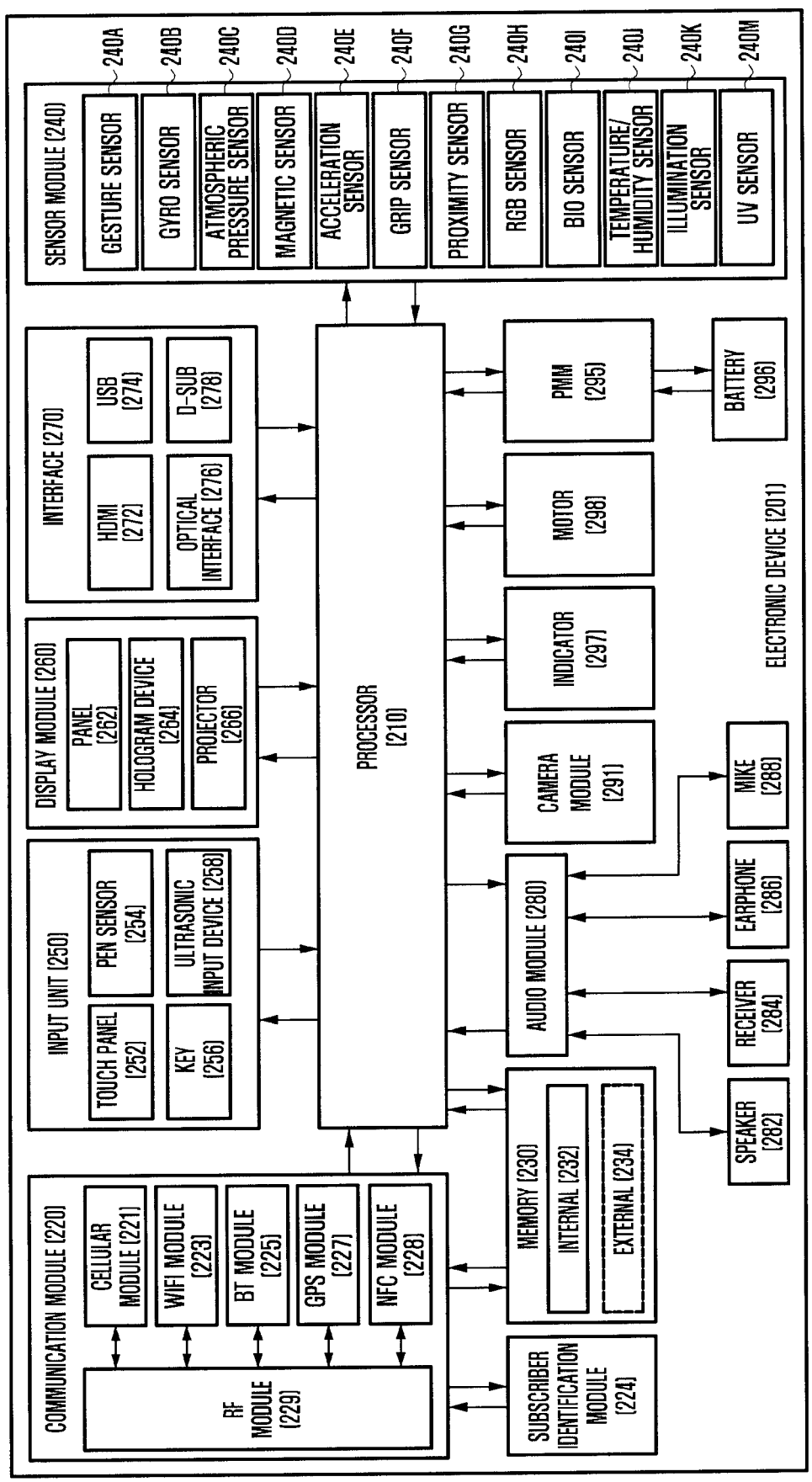
FIG. 2 is a block diagram illustrating a configuration of an electronic device according to various example embodiments.

FIG. 2 is a block diagram illustrating an electronic device 201 according to various embodiments of the present disclosure. The electronic device 201 may form, for example, the whole or part of the electronic device 101 shown in FIG. 1.

Referring to FIG. 2, the electronic device 201 may include at least one processor or "AP" 210, a communication module 220, a subscriber identification module (SIM) card 224, a memory 230, a sensor module 240, an input unit or input device 250, a display or display module 260, an interface 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a system on chip (SoC). According to an embodiment, the processor 210 may further include a graphics processing unit (GPU) and/or an image signal processor.

The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory. The communication module 220 (e.g., the communication interface 170) may perform a data communication with any other electronic device (e.g., the electronic device 104 or the server 106) connected to the electronic device 201 (e.g., the electronic device 101) through the network. According to an embodiment, the communication module 220 may include therein a cellular module 221, a Wi-Fi module 223, a BT module 225, a GNSS or GPS module 227, an NFC module 228, and a radio frequency (RF) module 229. The cellular module 221 is capable of providing a voice call, a video call, a short message service (SMS), an internet service, etc., through a communication network, for example. According to an embodiment, the cellular module 221 is capable of identifying and authenticating an electronic device 201 in a communication network by using a SIM 224 (e.g., a SIM card). According to an embodiment, the cellular module 221 is capable of performing at least part of the functions provided by the processor 210. According to an embodiment, the cellular module 221 is also capable of including a communication processor (CP).

As illustrated in FIG. 2, the Wi-Fi module 223, the BT module 225, the GNSS module 227, and the NFC module 228 are each capable of including a processor for processing data transmitted or received through the corresponding module.

The NFC module 228 is capable of including a processor for processing data transmitted or received through the corresponding module. According to various embodiments, at least part of the cellular module 221, Wi-Fi module 223, BT module 225, GNSS module 227, NFC module 228, and other modules, such as a MST module (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to an embodiment, at least one of the cellular module 221, the Wi-Fi module 223, the BT module 225, the GNSS module 227, and the NFC module 228 is capable of transmission/reception of RF signals through a separate RF module. The SIM module 224 is capable of including a card including a SIM and/or an embedded SIM. The SIM module 224 is also capable of containing unique identification information, e.g., integrated circuit card identifier (ICCID), or subscriber information, e.g., international mobile subscriber identity (IMSI).

As illustrated in FIG. 2, memory 230 (e.g., memory 103 shown in FIG. 1) is capable of including a built-in or internal memory 232 and/or an external memory 234. The built-in or internal memory 232 is capable of including at least one of the following: a volatile memory, e.g., a dynamic random access memory (DRAM), a static RAM (SRAM), a synchronous dynamic RAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure or barometer sensor 240C, a magnetic sensor 240D, an acceleration sensor 240E, a grip sensor 240F, a proximity sensor 240G, a color or RGB sensor 240H (e.g., a red, green and blue (RGB) sensor), a biometric sensor 240I, a temperature/humidity sensor 240J, an illuminance sensor 240K, and an ultraviolet (UV) sensor 240M.

Additionally or alternatively, the sensor module 240 is capable of further including on or more of the following sensors or operations (not shown): an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein.

In various embodiments of the present disclosure, the electronic device 201 is capable of including a processor, configured as part of the processor 210 or a separate component, for controlling the sensor module 240. In this case, while the processor 210 is operating in a sleep mode, the processor is capable of controlling the sensor module 240. The input device 250 is capable of including a touch panel 252, a (digital) pen sensor (digital pen or stylus) 254, a key 256, or an ultrasonic input unit or device 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit or device 264, or a projector 266. The panel 262 may include the same or similar configurations as the display 160 shown in FIG. 1. The panel 262 may be implemented to be flexible, transparent, or wearable.

The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 is capable of including an HDMI 272, a USB 274, an optical interface 276, or a D-subminiature (D-sub) 278. The interface 270 may be included in the communication interface 107 shown in FIG. 1. Additionally or alternatively, the interface 270 is capable of including a mobile high-definition link (MHL) interface, an SD card/MMC interface, or an infrared data association (IrDA) standard interface.

The audio module 280, as illustrated in FIG. 2, is capable of providing bidirectional conversion between a sound and an electronic signal. At least part of the components in the audio module 280 may be included in the input/output interface 150 shown in FIG. 1. The audio module 280 is also capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management IC (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
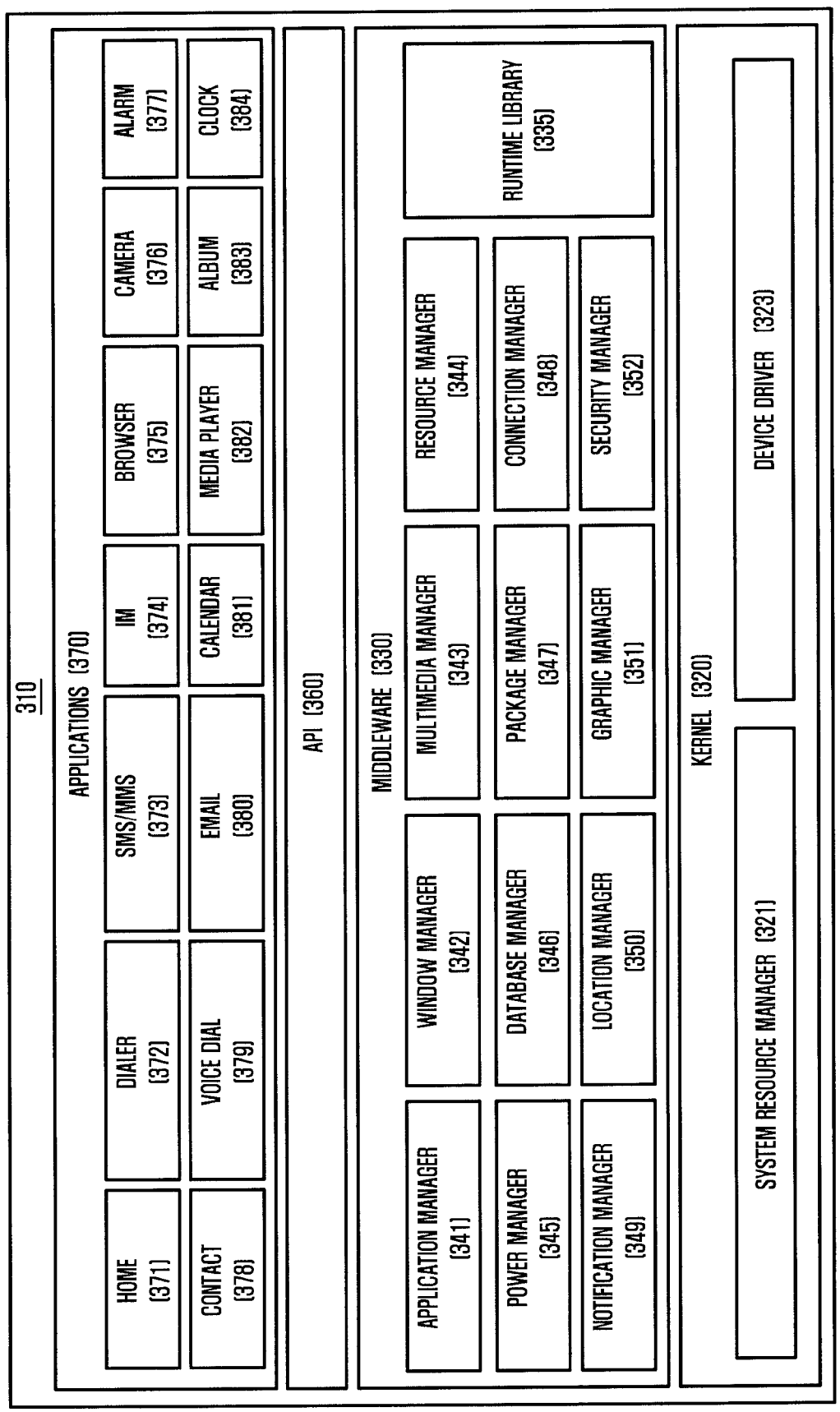
FIG. 3 is a block diagram illustrating a configuration of a program module according to various example embodiments.

FIG. 3 is a block diagram illustrating a configuration of a programming module 310 according to various embodiments of the present disclosure.

The programming module 310 may be included (or stored) in the electronic device 101 (e.g., the memory 130) illustrated in FIG. 1, or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware (e.g., the hardware 200 of FIG. 2), and may include an operating system (OS) controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141 in FIG. 1) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity or connection manager 348, a notification manager 349, a location manager 350, a graphic manager 351, a security manager 352, and any other suitable and/or similar manager(s).

The runtime library 335 may include, for example, a library module used by a complier, in order to add a new function by using a programming language during the execution of the application(s) 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345, as illustrated in FIG. 3, may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity or connection manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application(s).

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Figure 4:
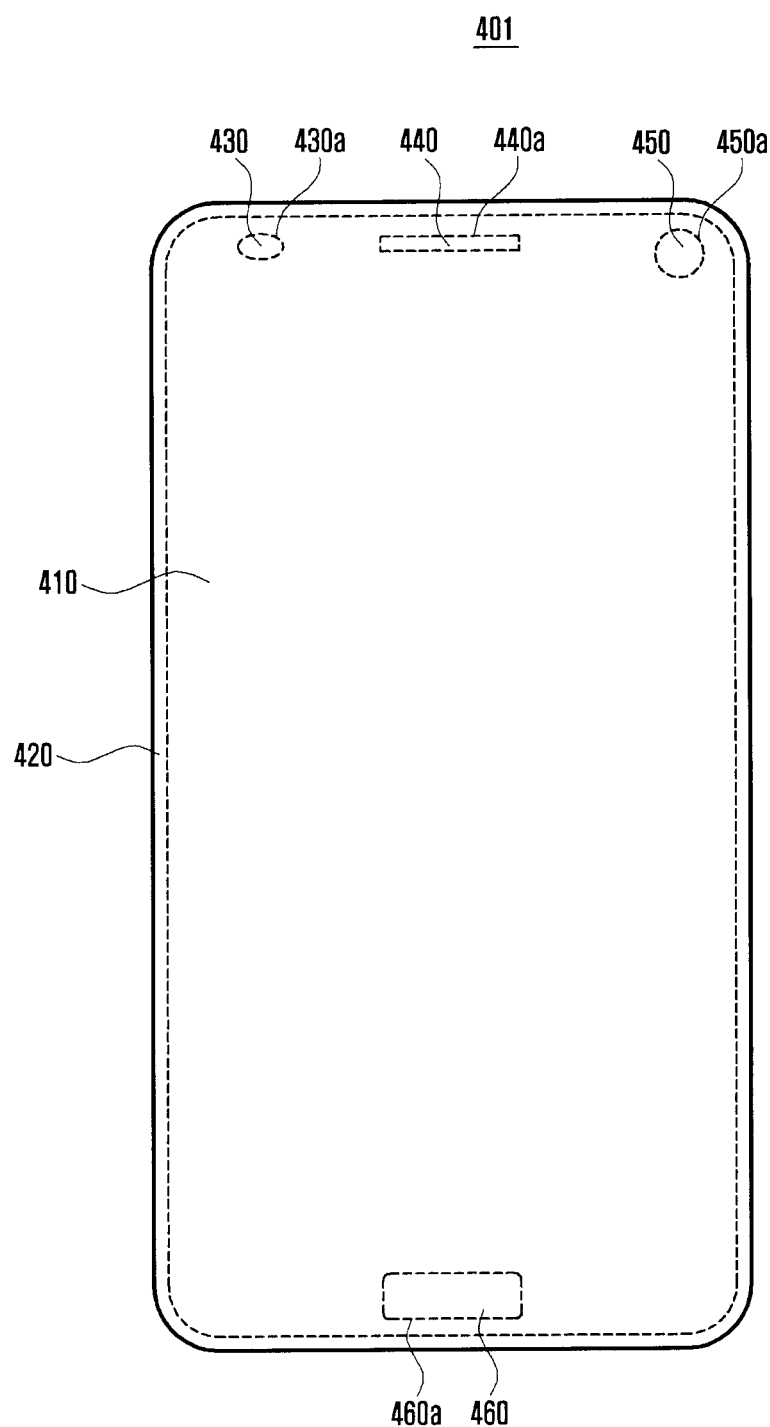
FIG. 4 is a front view illustrating an electronic device according to various example embodiments.

FIG. 4 is a front view illustrating an electronic device according to various example embodiments.

FIG. 4 illustrates a front surface of an electronic device 401 according to various example embodiments. The electronic device 401 may include a display 410, housing 420, optical sensor 430, receiver 440, camera 450, and fingerprint sensor 460. According to an example embodiment, the display 410 may be formed at an entire front surface of the electronic device 401. Accordingly, the housing 420 may not be formed at the front surface of the electronic device 401.

The display 410 may be extended to, for example, the side surface of the electronic device 401. Further, according to an example embodiment, the display 410 may be formed in a portion of the front surface of the electronic device 401. Accordingly, the housing 420 may be formed in the remaining portions of the front surface of the electronic device 401.

Figure 6:
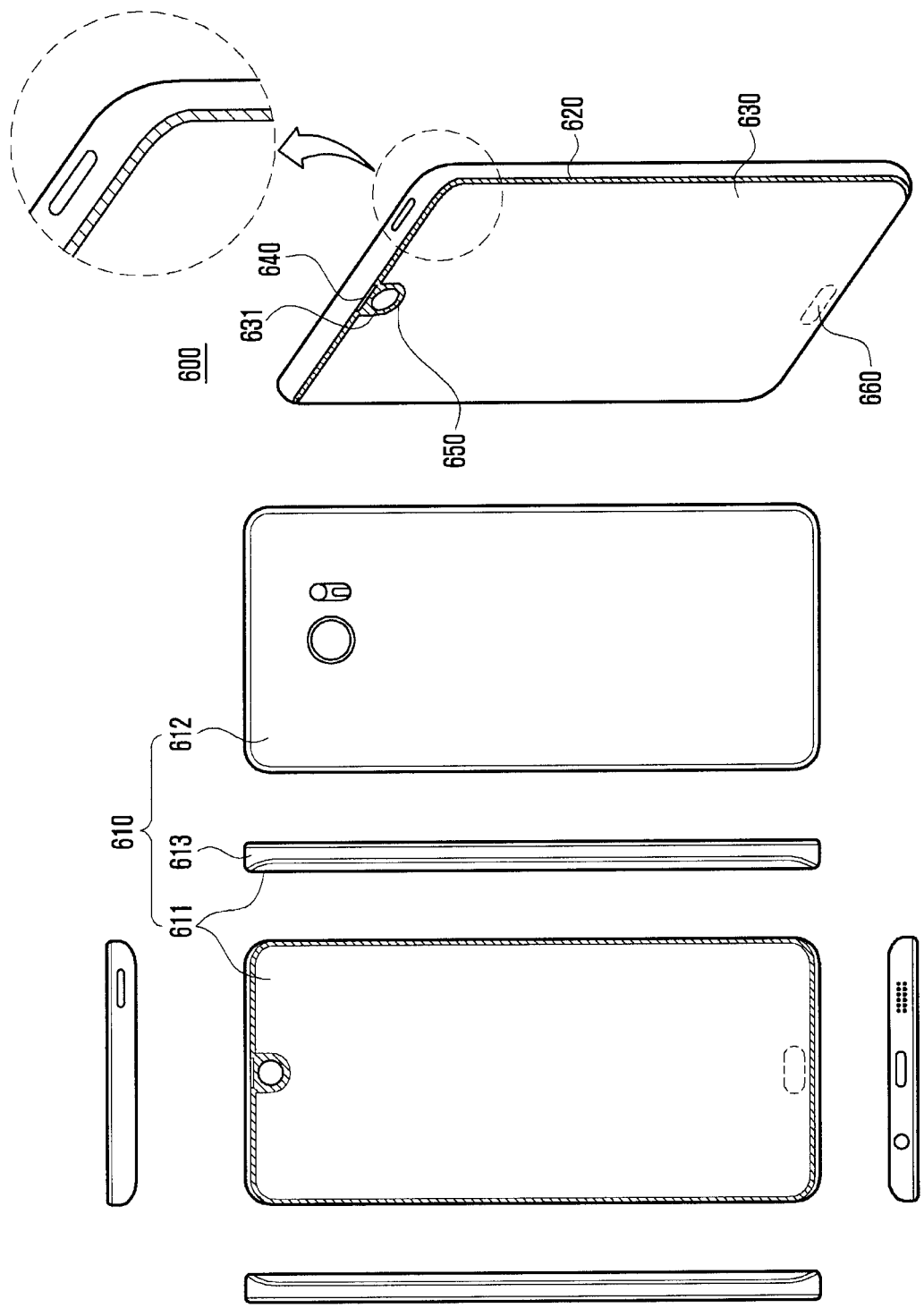
FIG. 6 is a perspective view and a set of 6 drawings illustrating an electronic device according to an example embodiment.

The display 410 may be protected by cover glass 620 (see FIG. 6). According to an example embodiment, the cover glass 620 may have a plurality of holes (or openings). For example, the cover glass 620 may include an optical sensor hole 430*a*, receiver hole 440*a*, camera hole 450*a*, and fingerprint sensor hole (or home button hole) 460*a*. The cover glass 620 may further include a light emitting diode (LED) hole 735 (see FIG. 7). Further, the cover glass 620 may further include an opening, hole or an exsect portion (e.g., a 'cut out' portion 631) (see FIG. 6).

According to various example embodiments of the present disclosure, the optical sensor 430, the receiver 440, the camera 450, and the fingerprint sensor 460 may be positioned at, for example, the low end of the housing 420 or the display 410. According to various example embodiments of the present disclosure, the optical sensor 430, the receiver 440, the camera 450, and the fingerprint sensor 460 may be included in, for example, the display 410. The optical sensor 430 may include, for example, a proximity sensor, illumination sensor, iris sensor, or UV sensor.

According to an example embodiment, a position of the optical sensor 430, the receiver 440, the camera 450, and the fingerprint sensor 460 is not limited to that of FIG. 4. For example, the optical sensor 430 may be positioned at the low end of the electronic device 401.

Figure 5:
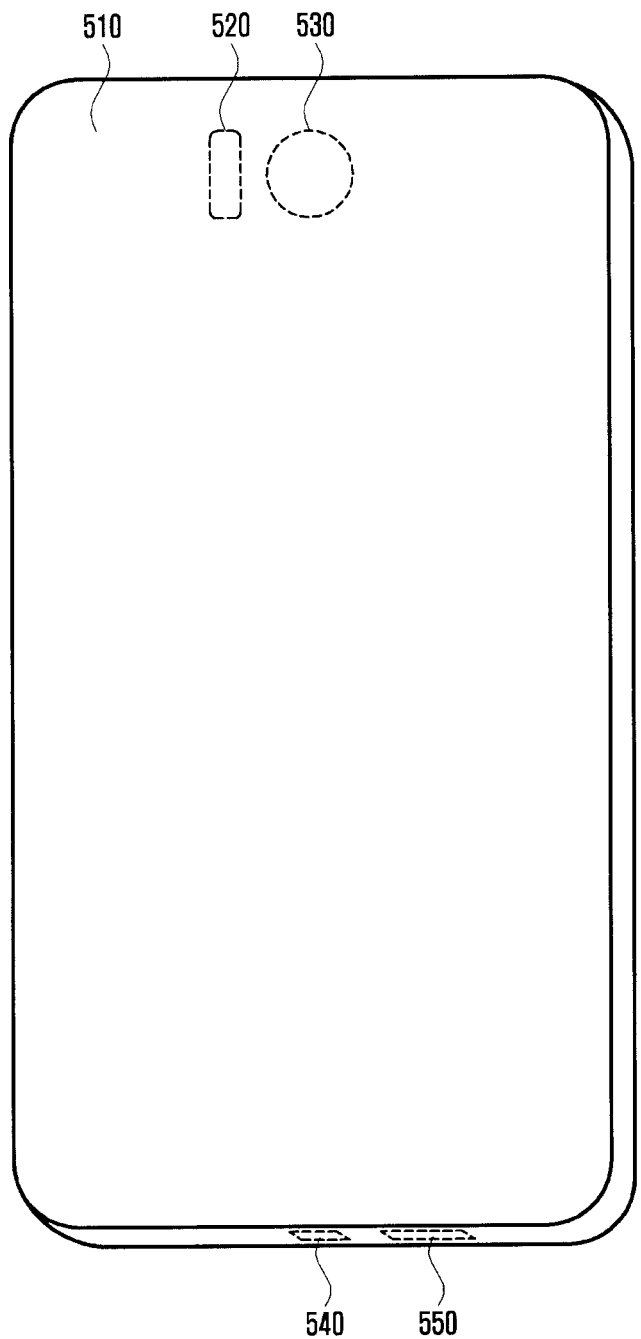
FIG. 5 is a rear view illustrating an electronic device according to various example embodiments.

FIG. 5 is a rear view illustrating an electronic device according to various example embodiments.

FIG. 5 illustrates a rear surface and a side surface of an electronic device 501 according to various example embodiments. The electronic device 501 may include a housing 510, bio sensor 520, camera 530, interface 540, and speaker 550.

According to an example embodiment, the housing 510 may be formed at a rear surface and a side surface of the electronic device 501. According to an example embodiment, the bio sensor 520 and the camera 530 may be positioned at a rear surface of the electronic device 501. According to an example embodiment, the interface 540 and the speaker 550 may be positioned at a side surface of the electronic device 501. According to an example embodiment, a position of the bio sensor 520, the camera 530, the interface 540, and the speaker 550 is not limited to that of FIG. 5.

FIG. 6 is a perspective view and a set of 6 drawings illustrating an electronic device according to an example embodiment.

With reference to FIG. 6, an electronic device 600 according to an example embodiment may include a housing 610, cover glass 620, display panel 630, camera module 640, receiver hole 650, and home button 660.

The housing 610 may include a first surface 611 facing in a first direction (front surface), a second surface 612 facing in a second direction (rear surface) opposite to the first direction, and a side surface 613 that encloses a space between the first surface 611 (or "front" surface) and the second surface 612 (or "rear" surface).

The cover glass 620 may protect a configuration such as the display panel 630 of the electronic device 600. The cover glass 620 may correspond to at least a front surface of the electronic device 600. For example, the cover glass 620 may occupy the entire front surface. The cover glass 620 may occupy a portion of the front surface and the side surface. The cover glass 620 may be formed in a plane or in a curved surface in which the upper end, the low end, the left side end and/or the right side end are bent. The cover glass 620 may be made of a transparent material. The cover glass 620 may be made of a material such as reinforced glass, plastic (e.g., polyethylene terephthalate (PET)), or aluminum oxide.

The display panel 630 may be disposed under the cover glass 620. The display panel 630 may be bent such that the left side end, the right side end, the upper end and/or the low end form a curved surface and may to be disposed within the housing 610.

The display panel 630 may be a full front display occupying most of the front surface of the electronic device. A disposition of other configurations may be changed by enlargement of the display panel 630. For example, configurations such as the camera module 640 and a receiver (not shown) may be disposed at an outermost edge of the electronic device 600.

The display panel 630 may include an active area 632 and an inactive area 633. The active area 632 may be exposed through a transparent area of the cover glass 620. The active area 632 may output light according to an electric signal supplied through a scan line and a data line. An aspect ratio of the active area 632 may be, for example, 18.5:9. Further, an aspect ratio of the active area 632 may include 4:3, 3:2, 8:5, 16:10, 5:3, or 21:9.

According to an example embodiment, the active area 632 may occupy at least a portion of a front surface and a side surface. For example, the active area 632 may be disposed in a form that encloses the front surface and the side surface. The active area 632 of the electronic device 600 according to an example embodiment may be further adjacent to a side surface than a common active area.

A side portion of the active area 632 may perform a function of a soft key that can adjust a volume. A position of the soft key may be changed based on a user grip state or use history. The active area 632 may occupy most (e.g., about 90% or more of a front area) of the front surface.

The inactive area 633 may be an area that encloses the active area 632. The inactive area 633 of the electronic device 600 according to an example embodiment may be smaller than the inactive area 633 of the common electronic device 600. At least a portion of the inactive area 633 may be exposed through the cover glass 620.

The inactive area 633 may be, for example, a peripheral portion of the display panel 630 and may be an area covered by an opaque masking layer. The opaque masking layer may be formed by printing a layer in the cover glass 620. A thickness ratio between the inactive area 633 of a horizontal direction and the inactive area 633 of a vertical direction may be, for example, 1:1, 2:1, or 3:1. In another example, a thickness ratio between the inactive area 633 of the upper end, the inactive area 633 of the side end, and the inactive area 633 of the low end may be, for example, 2:1:4.

The display panel 630 may include at least one opening portion (or opening) or at least one cut out portion. For example, the display panel 630 may include at least one opening portion 631 formed at an upper end portion of the active area 632. The display panel 630 may be bent such that the opening portion 631 is positioned at a corner and may be disposed within the housing 610.

As shown in FIG. 6, when viewing from a front surface of the electronic device 600, the opening portion 631 may form a U-shaped space. Various modules of the electronic device 600 may be exposed through a space formed by the opening portion 631.

In this specification, a touch screen display may mean a module including a configuration such as a touch screen, cover glass and/or polarizing plate together with the display panel 630.

The camera module 640 may be disposed at a position corresponding to at least one opening portion or at least one cut out portion. For example, the camera module 640 may be disposed at a space formed by at least one opening portion or at least one cut out portion. For example, the camera module 640 may be disposed at a space formed by the opening portion 631 formed at an upper end portion of the active area 632. The camera module 640 may be exposed at the outside through the cover glass 620. For example, the camera module 640 may be viewed at the outside through the cover glass 620 in a state disposed under the cover glass 620. The camera module 640 may detect light applied from the outside through the cover glass 620 to acquire an image.

According to an example embodiment, the camera module 640 may be disposed to be exposed through the center of the upper end of the cover glass 620.

According to an example embodiment, the camera module 640 may be disposed to be adjacent to the maximum at an outer edge of the front surface.

The receiver hole 650 may transfer a sound generated by a receiver disposed within the housing 610 to an exterior of the housing. The receiver hole 650 may be formed at the front surface 611 of the housing 610. For example, the receiver hole 650 may be formed in a metal frame of the side surface 613.

The front surface 611 of the housing 610 may be formed—including or incorporating a single metal frame with the side surface 613 with a predetermined curvature. As shown in FIG. 6, the electronic device 600 may include a plurality of receiver holes 650. By forming the receiver hole 650 at the side surface 613, a sound generated by the receiver may be transferred to an exterior without impacting configuration of the display panel 630 occupying the front surface 611 of the electronic device 101. In FIG. 6, the receiver hole 650 is formed at the front surface 611 of the housing 610, but the present disclosure is not limited thereto and the receiver hole 650 may be formed at the side surface 613 of the housing 610.

The home button 660 may be disposed at the low end of the front surface of the electronic device 600. The home button 660 may be a physical key or a soft key. When the home button 660 is a physical key, for a disposition of the home button, the display panel 630 may include an opening portion (e.g., the same as an opening portion of the upper end) or a cut out portion formed at the low end of the active area 632. The home button 660 may be disposed within a space formed by the opening portion 631 (e.g., or the cut out portion).

The home button 660 may be implemented as a 'soft' key (e.g., implemented by software) at the low end of the front surface 611 of the electronic device 600. When the home button 660 is a soft key, a fingerprint sensor may be disposed under an area of the home button 660 of the display panel 630. The cover glass 620 may include a recess portion formed at a position where the fingerprint sensor is disposed.

As described above, the electronic device 600 according to an example embodiment may include the display panel 630 exposed through the front surface 611 of the electronic device 600 and the camera module 640 positioned within the display panel 630.

Figure 7:
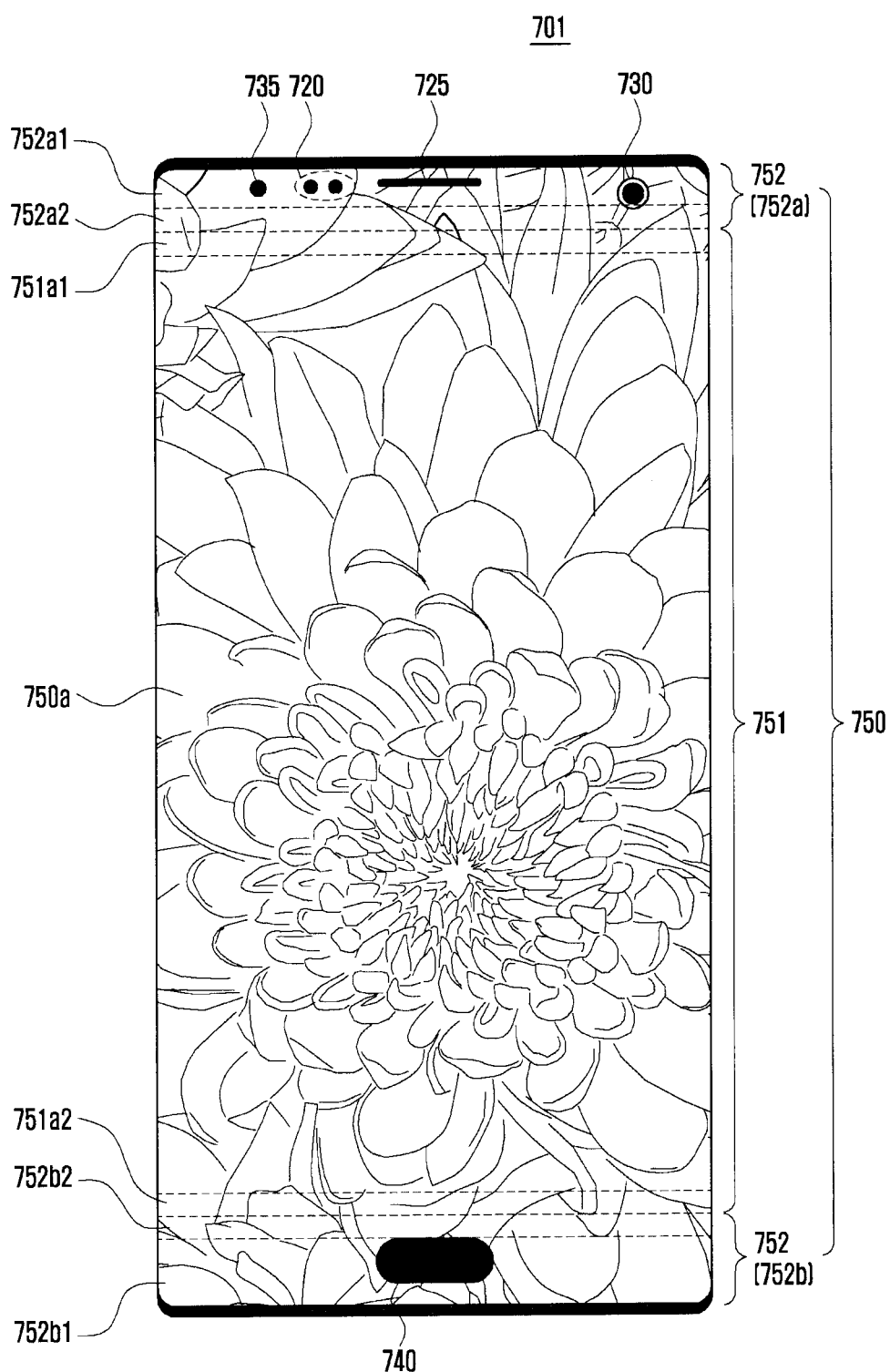
FIG. 7 is a front view illustrating an electronic device according to an example embodiment.

FIG. 7 is a front view illustrating an electronic device according to an example embodiment.

FIG. 7 illustrates a front surface of an electronic device 701 according to an example embodiment. In a display (e.g., a full front display) 750 of the electronic device 701, a content (e.g., image) 750*a* is displayed. The display 750 may include an edge display enlarged to one side surface (or both side surfaces). For example, at a front surface of the electronic device 701, at the upper end and/or the low end of the display 750, the housing 610 may be exposed. At a front surface of the electronic device 701, at the left side and/or the right side of the display 750, the housing 610 may be exposed. According to various example embodiments of the present disclosure, at a front surface of the electronic device 701, at the left side and/or the right side of the display 750, the housing 610 may not be exposed.

The display 750 includes a main area 751 and an extension area 752. The extension area 752 may include a first extension area 752*a* extended at an upper end portion of the main area 751 and a second extension area 752*b* extended at the low end of the main area 751.

In the first extension area 752*a*, one or a plurality of holes or 'hole areas' (at least one of 720, 725, 730, and 735) may be positioned. According to various example embodiments of the present disclosure, in the second extension area 752*b*, one or a plurality of hole areas 740 may be positioned.

A size of the main area 751 may be greater than that of the extension area 752. A size of the first extension area 752*a* may be the same as or different from that of the second extension area 752*b*. For example, a size of the second extension area 752*b* may be greater than that of the first extension area 752*a*.

The display 750 may include a main area 751 and a first extension area 752*a*. The display 750 may include a main area 751 and a second extension area 752*b*. Further, the display 750 may include the entire of the main area 751, the first extension area 752*a*, and the second extension area 752*b*.

The main area 751 may include a first area 751*a*1 positioned at an upper end portion of the main area 751 and connected to the first extension area 752*a*. Further, the main area 751 may include a second area 751*a*2 positioned at the low end of the main area 751 and connected to the second extension area 752b of the low end. A size of the first area 751a1 may be the same as or different from that of the second area 751a2.

According to various example embodiments of the present disclosure, the first area 751a1 and/or the second area 751a2 may be an edge area of the main area 751. The first area 751a1 and/or the second area 751a2 may correspond to an edge area of one side of an image (or a content).

According to various example embodiments of the present disclosure, in the display 750, a size of the main area 751 may be, for example, 1440×2560 pixels. A size of the first extension area 752a may be 1440×216 pixels. A size of the second extension area 752b may be 1440×216 pixels. A size of the first area 751a1 may be 1440×10 pixels. Further, a size of the second area 751a2 may be 1440×10 pixels.

A size of the main area 751, a size of the first extension area 752a, a size of the second extension area 752b, a size of the first area 751a1 and/or a size of the second area 751a2 are an example, and it may be easily understood to a person of ordinary skill in the art that the sizes each may be changed to correspond to an aspect ratio of the display 750.

Analysis of the first area 751a1 or analysis of the second area 751a2 may mean analysis of an edge area positioned at one side of an image (or a content).

The processor 210 may analyze the first area 751a1 to enlarge and display the content 750a displayed in the main area 751 to the first extension area 752a. The processor 210 may analyze the second area 751a2 to enlarge and display the content 750a displayed in the main area 751 to the second extension area 752b.

The processor 210 may analyze the first area 751a1 and/or the second area 751a2 to enlarge and display the content 750a displayed in the main area 751 to the first extension area 752a and/or the second extension area 752b.

The first extension area 752a may be divided into an extension area 752a1 and an extension area 752a2. A size of the extension area 752a1 may be different from that of the extension area 752a2. A size of the extension area 752a1 may be determined by a position of a camera (or a camera hole) 730. When the center (or optical axis) of the camera (or the camera hole) 730 is positioned at a position (e.g., adjacent to the main area) lower than a central point (e.g., a position of an intermediate pixel among pixels corresponding to a length of the first extension area) of the first extension area 752a, a size of the extension area 752a1 may be different from that of the extension area 752a2.

The second extension area 752b may be divided into an extension area 752b1 and an extension area 752b2. A size of the extension area 752b1 may be different from that of the extension area 752b2. A size of the extension area 752b1 may be determined by a position of a fingerprint sensor (or the home button) 740. When the fingerprint sensor 740 is positioned at a position (e.g., adjacent to the main area) upper than a central point (e.g., a position of an intermediate pixel among pixels corresponding to a length of the second extension area) of the second extension area 752b, a size of the extension area 752b1 may be different from that of the extension area 752b2.

The processor 210 may analyze the first area 751a1 to enlarge and display the content 750a displayed in the main area 751 to the extension area 752a2. Further, the processor 210 may analyze the second area 751a2 to enlarge and display the content 750a displayed in the main area 751 to the extension area 752b2.

The content 750a may be displayed in the main area 751 of the display 750 by the processor 210. The content 750a displayed in the main area 751 may be enlarged to the main area 751 and the first extension area 752a of the display 750 by the processor 210. The content 750a displayed in the main area 751 may be enlarged to the main area 751 and the second extension area 752b of the display 750 by the processor 210. The content 750a displayed in the main area 751 may be enlarged to the main area 751, the first extension area 752a, and the second extension area 752b of the display 750 by the processor 210.

The content 750a displayed in the main area 751 may be enlarged to the main area 751, the first extension area 752a, and the extension area 752b2 of the display 750 by the processor 210. Further, the content 750a displayed in the main area 751 may be enlarged to the main area 751, the extension area 752a2, and the extension area 752b2 of the display 750 by the processor 210.

In an example embodiment, a hole, opening, or cut out portion of the front surface may be referred to as a hole area. In an example embodiment, a hole, opening, or cut out portion of the side surface (e.g., a volume button or a power button) may be referred to as a hole area. In an example embodiment, a hole, opening, or cut out portion of the rear surface (e.g., camera, flashlight) may be referred to as a hole area.

An electronic device according to an example embodiment of the present disclosure includes a housing including a first surface facing in a first direction and a second surface facing in a second direction opposite to the first direction; a touch screen display disposed between the first surface and the second surface, exposed through the first surface, and having a main area and an extension area; a hole area positioned at the extension area; at least one processor electrically connected to the display; and a memory electrically connected to the processor, such that the memory stores at least one instruction executed by the processor upon executing a function, and the processor controls to analyze an edge area of a selected content, to enlarge the content by one of interference enlargement and/or non-interference enlargement according to an analysis result, and to display the content in the display area.

In an example embodiment, when an analysis result is interference enlargement, the processor may control to display the content in the main area and the extension area, and enlargement of the content may be limited by the hole area.

In an example embodiment, when an analysis result is non-interference enlargement, the processor may control to display the content in a partial area of the main area and the extension area.

In an example embodiment, the hole area may include one of a hole, opening, and cut out portion.

Figure 8:
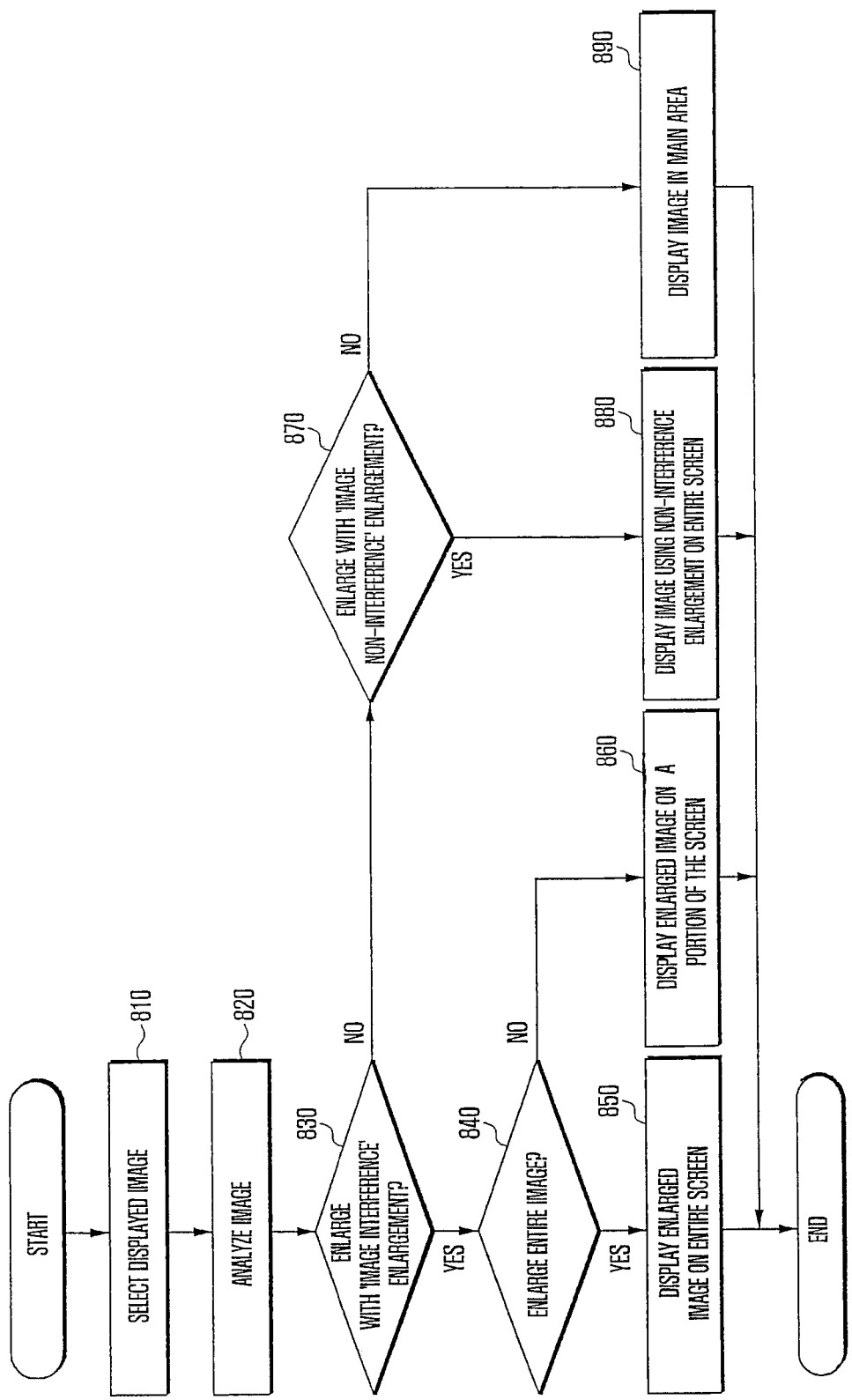
FIG. 8 is a flowchart illustrating a method of controlling an electronic device according to an example embodiment.

FIG. 8 is a flowchart illustrating a method of controlling an electronic device according to an example embodiment, and FIGS. 9A to 9K are diagrams illustrating a method of controlling an electronic device according to an example embodiment.

At step 810 of FIG. 8, the electronic device may select an image displayed by a user input.

Figure 9A:
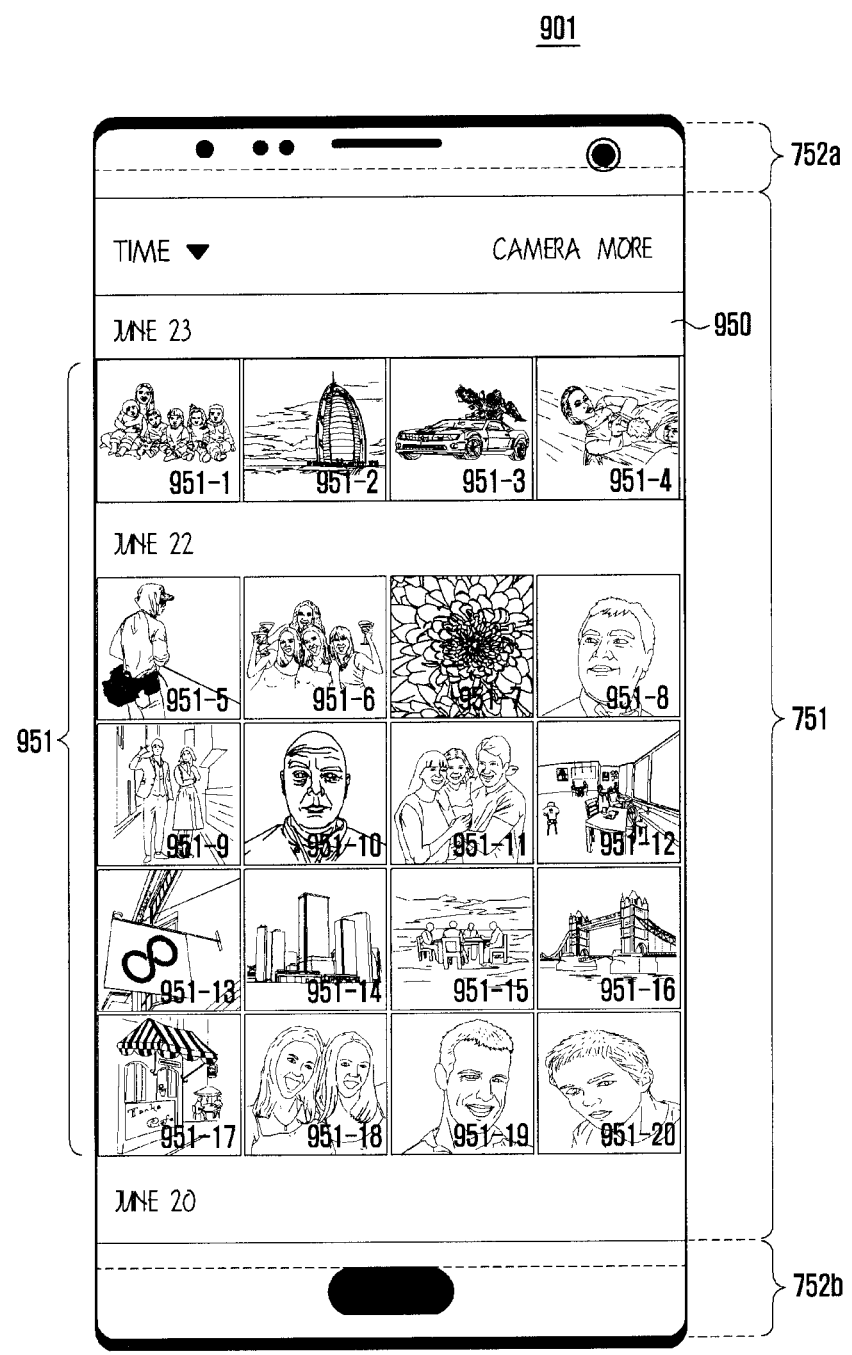

With reference to FIG. 9A, in a display 950 of an electronic device 901, an image (or thumbnail corresponding to an image) 951 is displayed. In the display 950 of the electronic device 901, an image (or shortcut corresponding to an image) (which is not shown in FIG. 9A) is displayed. According to various example embodiments of the present disclosure, in the display 950 of the electronic device 901, one or a plurality of images (or thumbnail corresponding to an image) 951-1 to 951-19 may be displayed through an application (e.g., via execution of a gallery or a photo application).

The application (e.g., a photo application) is an example and should be an application (e.g., web browser) that can display an image. The application for example may include a video player that displays an image or video.

The display 950 of the electronic device 901 according to an example embodiment may display an application screen, home screen, or lock screen including an image (or video).

Figure 9B:
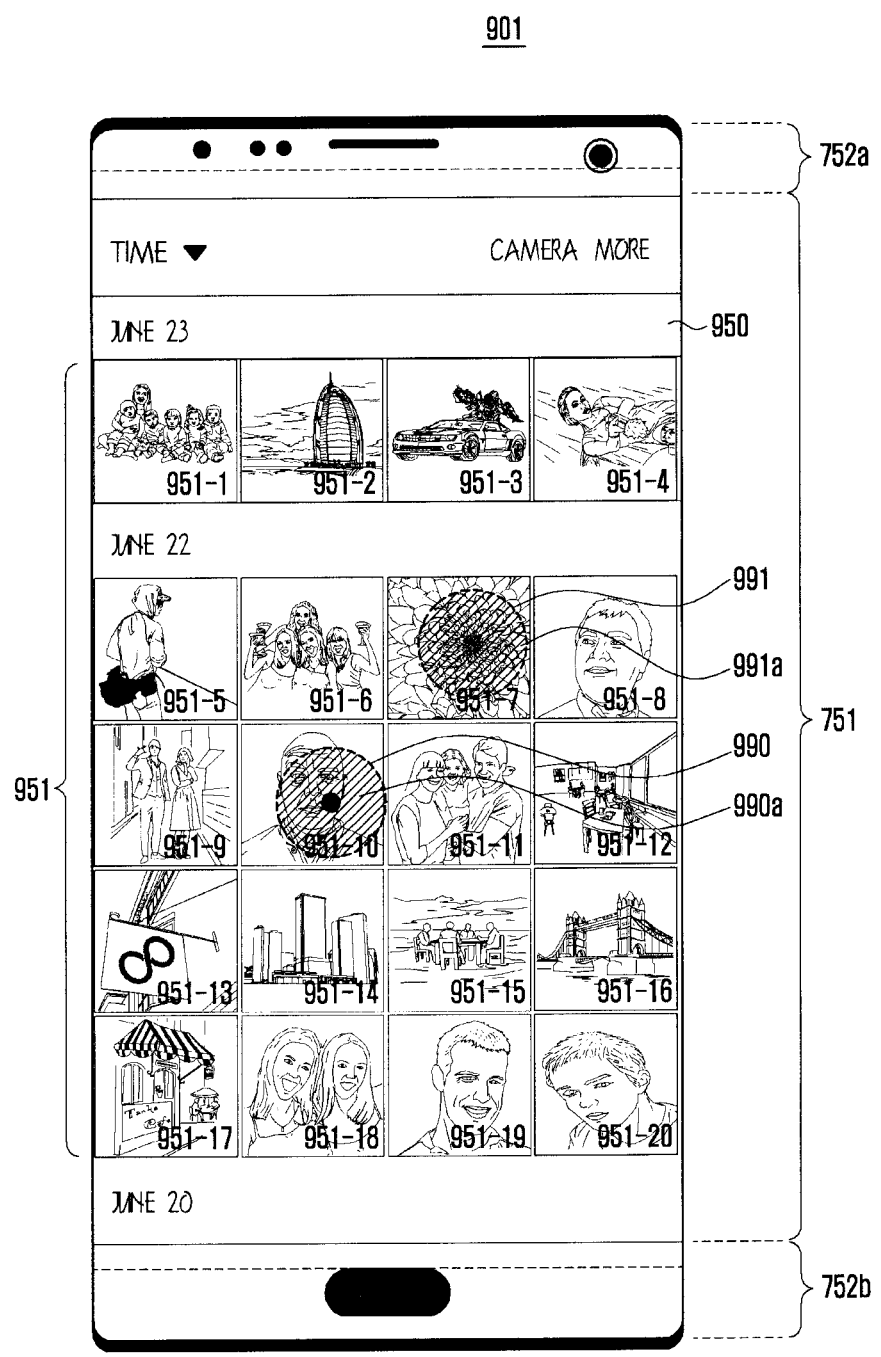

With reference to FIG. 9B, in one image 951-10, a first user input (e.g., touch or hovering) 990 is received.

The processor 210 may detect the first user input 990 using the panel 262. The processor 210 may calculate a first user input position (e.g., X1 coordinate and Y1 coordinate) 990a corresponding to the first user input 990 using an electric signal received from the panel 262.

According to various example embodiments, the processor 210 may store the first user input position 990a, a touch detection time (e.g., 11:15 AM) of the detected touch, and touch information corresponding to the touch at the memory 230.

According to an example embodiment, in another image 951-7, a second user input (e.g., touch or hovering) 991 may be received.

The processor 210 may detect the second user input 991 using the panel 262. The processor 210 may calculate a second user input position (e.g., X1 coordinate and Y1 coordinate) 991a corresponding to the second user input 991 using an electric signal received from the panel 262.

The processor 210 may store the second user input position 991a, a touch detection time (e.g., 11:15 AM) of the detected touch, and touch information corresponding to the touch at the memory 230.

The first user input 990 and/or the second user input 991 contacting the display 950 may occur by one of fingers including a thumb or a touchable input pen (or stylus (not shown).

Referring to FIG. 8, step 820, the processor 210 may analyze an image. For example, image 951-7 corresponding to the second user input 990 and to display the image 951-7 in the display 950. In an example embodiment, an image may include images 951-10 and 951-7. In an example embodiment, an image may include images 951-1 to 951-20. Further, in an example embodiment, an image may have a meaning including an image (already stored at the electronic device or capable of being downloaded at the electronic device).

With reference to FIG. 9B, the processor 210 analyzes an image 951-10 or 951-7 corresponding to a selected thumbnail. The processor 210 may analyze a first area 751a1 of an image corresponding to the selected thumbnail. The processor 210 may analyze a pixel count (e.g., 1440×10 pixels) included in the first area 751a1. Further, the processor 210 may analyze one or more—of the pixels (e.g., 1, 3, 5, 7, 9 pixels, 2, 5, 8 pixels, or a random pixel of 10 pixels) indicated by the pixel count (e.g., 1440×10 pixels) included in the first area 751a1.

The processor 210 may analyze a color of each adjacent pixel. The processor 210 may analyze a chroma of adjacent each pixel. According to various example embodiments of the present disclosure, the processor 210 may analyze a texture of adjacent each pixel. That is, the processor 210 may analyze a value of a color, chroma, or texture of each pixel. Specific algorithms corresponding to such pixel analysis is well-known technology; therefore, a detailed description thereof may be omitted.

When the difference between colors, chromas or textures of each pixel matches a particular threshold (e.g., 30%, may be changed) or less, the processor 210 may select execution of enlargement of the image to encompass the first extension area 752a. Further, when the difference between colors, chromas, or textures of each pixel exceeds a predetermined threshold (e.g., 30%), the processor 210 may determine that an image cannot be enlarged to the first extension area 752a.

The processor 210 may determine enlargement (e.g., enlargement of a background color) of an image to the first extension area 752a through analysis of the first area 751a1.

The processor 210 may analyze a second area 751a2 of an image corresponding to a selected thumbnail. The processor 210 may analyze a pixel (e.g., 1440×10 pixels) included in the second area 751a2.

Analysis of the second area 751a2 through the processor 210 is substantially similar to that of the first area 751a1 through the processor 210; therefore, a detailed description thereof may be omitted.

The processor 210 may analyze a value of a color, chroma, or texture of each pixel included in the second area 751a2. When the difference between colors chromas, or textures of each pixel is a threshold (e.g., 30) or less, the processor 210 may determine enlargement of an image to the second extension area 752b. Further, when the difference between colors, chromas, or textures of each pixel exceeds a threshold (e.g., 30%, may be changed), the processor 210 may determine that an image cannot be enlarged to the second extension area 752b.

The processor 210 may determine that an image cannot be enlarged to the second extension area 752b through analysis (e.g., comparison against a predetermined threshold variance) of the second area 751a2. In such a case, the processor 210 may additionally determine enlargement of an image to the area 752b2. For example, when the difference between colors, chromas, or textures of each pixel in the second area 751a2 is (in one embodiment) 50% or less, the processor 210 may determine enlargement of an image to the area 752b2.

The processor 210 may sequentially perform analysis of the first area 751a1 and analysis of the second area 751a2 or may perform analysis of the first area 751a1 and analysis of the second area 751a2 in reverse order.

At step 830 of FIG. 8, the processor may determine whether to enlarge the image using an 'interference enlargement' process.

That is, the processor 210 may determine whether to enlarge interference of an image. The processor 210 may determine whether to enlarge an image to at least one area of the first extension area 752a and the second extension area 752b according to an analysis result (e.g., threshold or less).

In an example embodiment, enlargement of an image may include image interference enlargement and image non-interference enlargement. Image interference enlargement may mean enlargement of an image to at least one area of the first extension area 752a and the second extension area 752b through analysis (e.g., a threshold or less) of the first area 751a1 or analysis (e.g., a threshold or less) of the second area 751a2. Enlargement of an image may include extension of an image.

"Interference enlargement" of an image may mean an image enlargement limit (or an image display limit in a partial area or a hole area) due interference (e.g., partial area or hole area) of the image enlargement by a hole, opening, or cut out portion of the front surface of the device. Further, image interference enlargement may mean interference (e.g., an image enlargement limit or an image display limit in a partial area) of image enlargement by a constituent element (e.g., sensor, receiver, camera, home button, or fingerprint sensor) corresponding to the hole, opening, or cut out portion of the front surface.

"Image non-interference" enlargement may mean non-interference (e.g., enlargement to a periphery of the hole, opening, or cut out portion of the front surface) of image enlargement by the hole, opening, or cut out portion of the front surface, such that the hole does not interfere with the display of the image. Further, image interference enlargement may mean non-interference of image enlargement by a constituent element (e.g., sensor, receiver, camera, home button, or fingerprint sensor) corresponding to the hole, opening, or cut out portion of the front surface.

Image non-interference enlargement may mean enlargement of an image to at least one area of the area 752*a*2 and the extension area 752*b*2 through analysis (e.g., more than a threshold) of the first area 751*a*1 or analysis (e.g., more than a threshold) of the second area 751*a*2.

When both the first area 751*a*1 and the second area 751*a*2 are a threshold or less according to an analysis result, the processor 210 may determine image interference enlargement. When one of the first area 751*a*1 and the second area 751*a*2 is a threshold or less according to an analysis result, the processor 210 may determine image interference enlargement. Further, when both the first area 751*a*1 and the second area 751*a*2 exceed a threshold according to an analysis result, the processor 210 may determine image non-interference enlargement.

According to determination of image interference enlargement, the processor 210 may enlarge an image to one of enlargement of the main area 751 and the first extension area 752*a*, enlargement of the main area 751 and the second extension area 752*b*, and enlargement of the main area 751, the first extension area 752*a*, and the second extension area 752*b*.

Returning to step 830 of FIG. 8, if the processor determines to utilize 'image interference' enlargement, the process continues at step 840. At step 830, if image interference is not enlarged (e.g., image non-interference enlargement), the process continues at step 870.

At step 840, the processor 210 may determine whether to enlarge an entire image using "image entire enlargement" or "image partial enlargement."

That is, when "image interference" is selected for enlarging an image, the processor 210 may determine to utilize one of image entire enlargement and image partial enlargement according to an analysis result.

"Image entire enlargement" may mean enlargement of an image to an entire area (including the main area 751, the first extension area 752*a*, and the second extension area 752*b*) of the display. Further, an entire area of the display may be referred to as an interference area of the display.

"Image partial enlargement" may mean enlargement of an image to a partial area (the main area 751 and the first extension area 752*a* or the first extension area 752*a* and the second extension area 752*b*) of the display. Further, a partial area of the display may be referred to as a non-interference area of the display.

At step 840 of FIG. 8, if an entire image is enlarged, the process continues at step 850. At step 840, if an entire image is not enlarged (e.g., image partial enlargement), the process continues at step 860.

At step 850, an enlarged image is displayed on an entire screen.

Figure 9C:
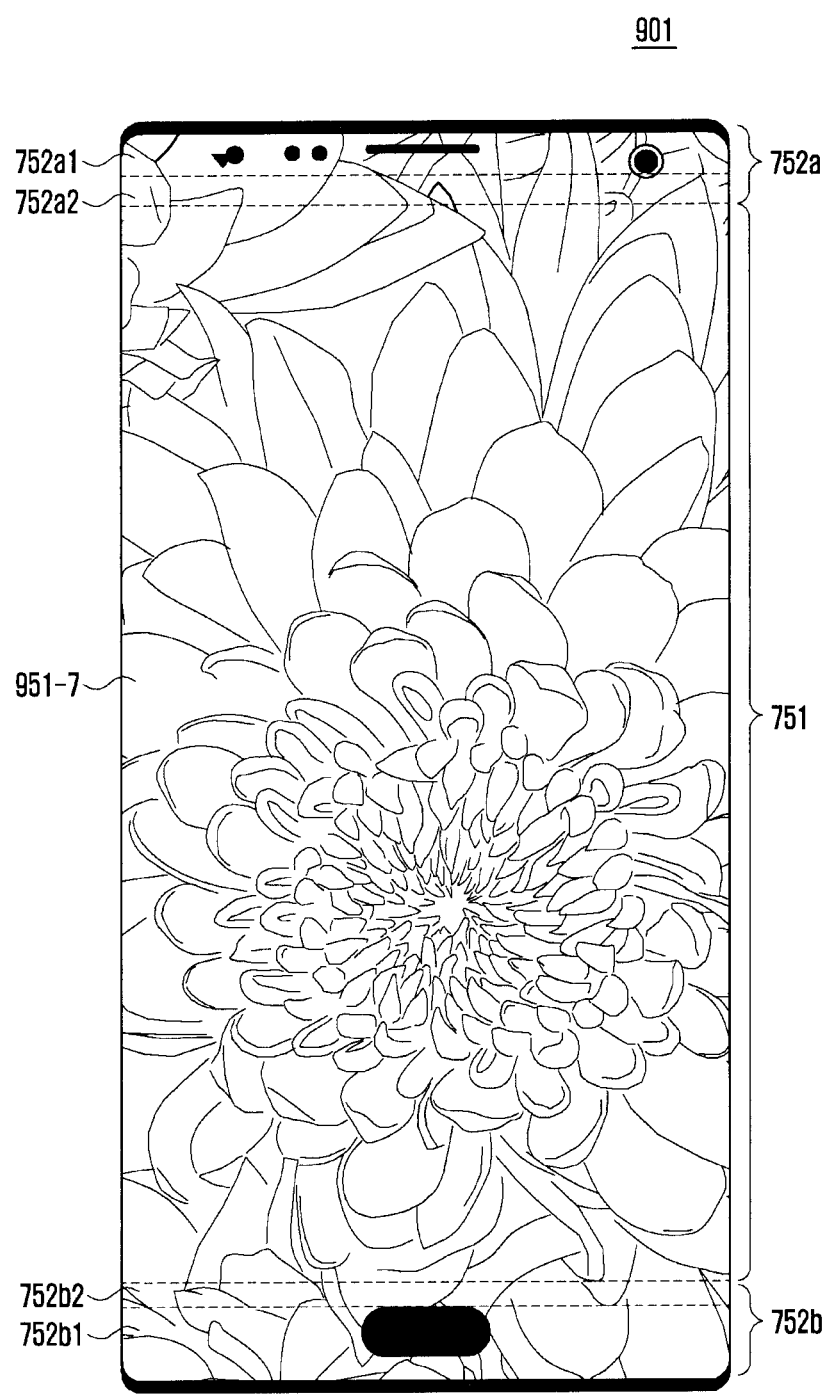

With reference to FIG. 9C, the processor 210 may control to enlarge and display an image (e.g., 951-7) on an entire screen. The processor 210 may control to enlarge and display an image 951-7 on an entire screen according to an analysis result. The entire screen is an area including the main area 751, the first extension area 752*a*, and the second extension area 752*b*. A size of the entire screen may be 1440×2992 pixels.

A size of the entire screen may be may be changed according to a screen size and/or an aspect ratio of the electronic device 901.

In an example embodiment, a screen of an application as well as an image may be displayed on the entire screen.

Figure 9D:
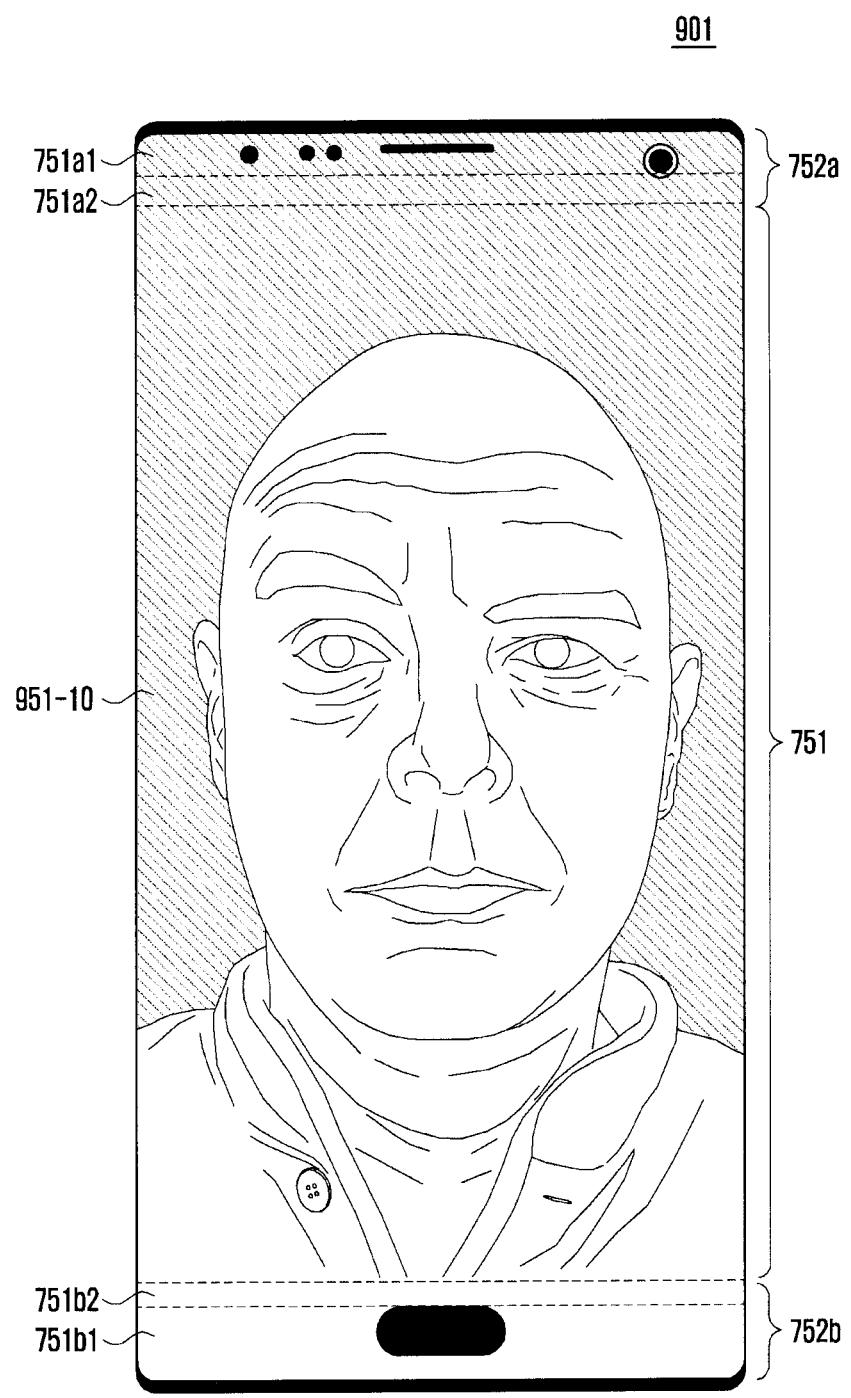
Figure 9E:
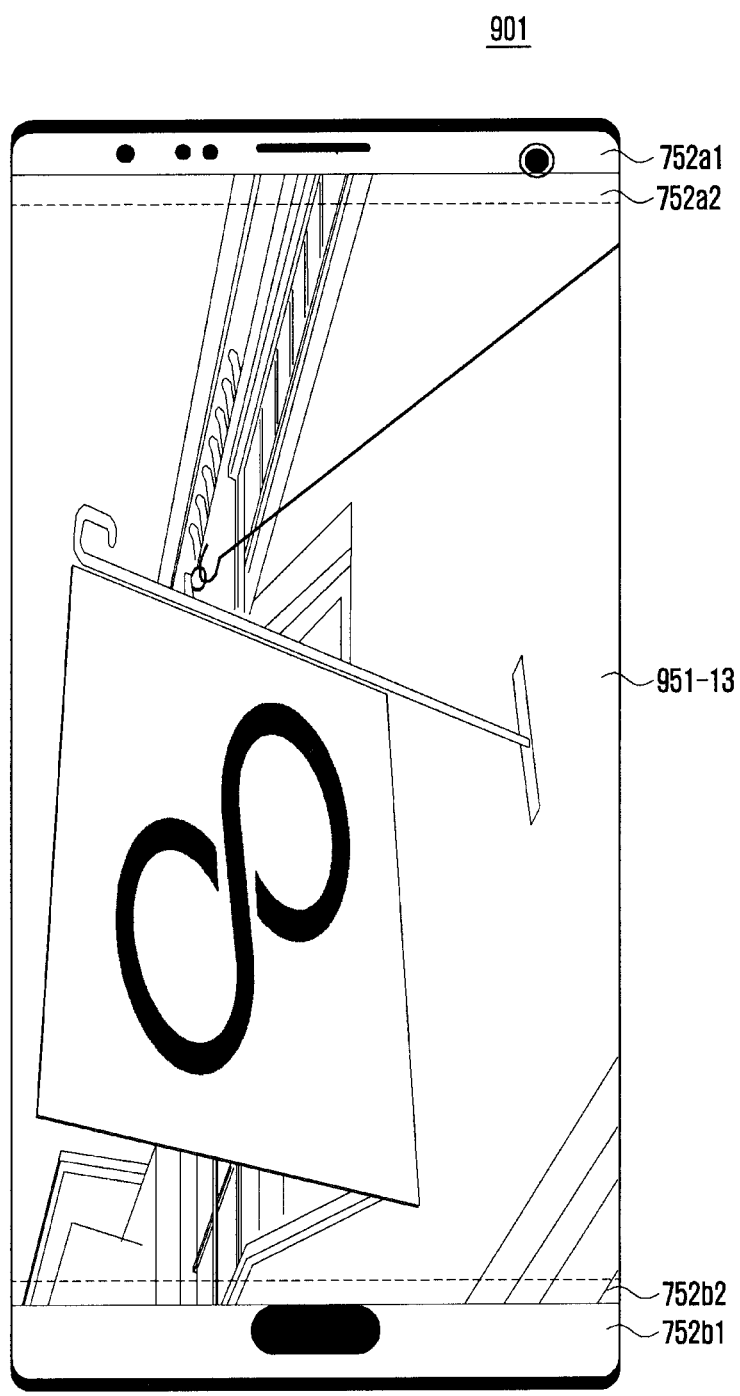
Figure 9F:
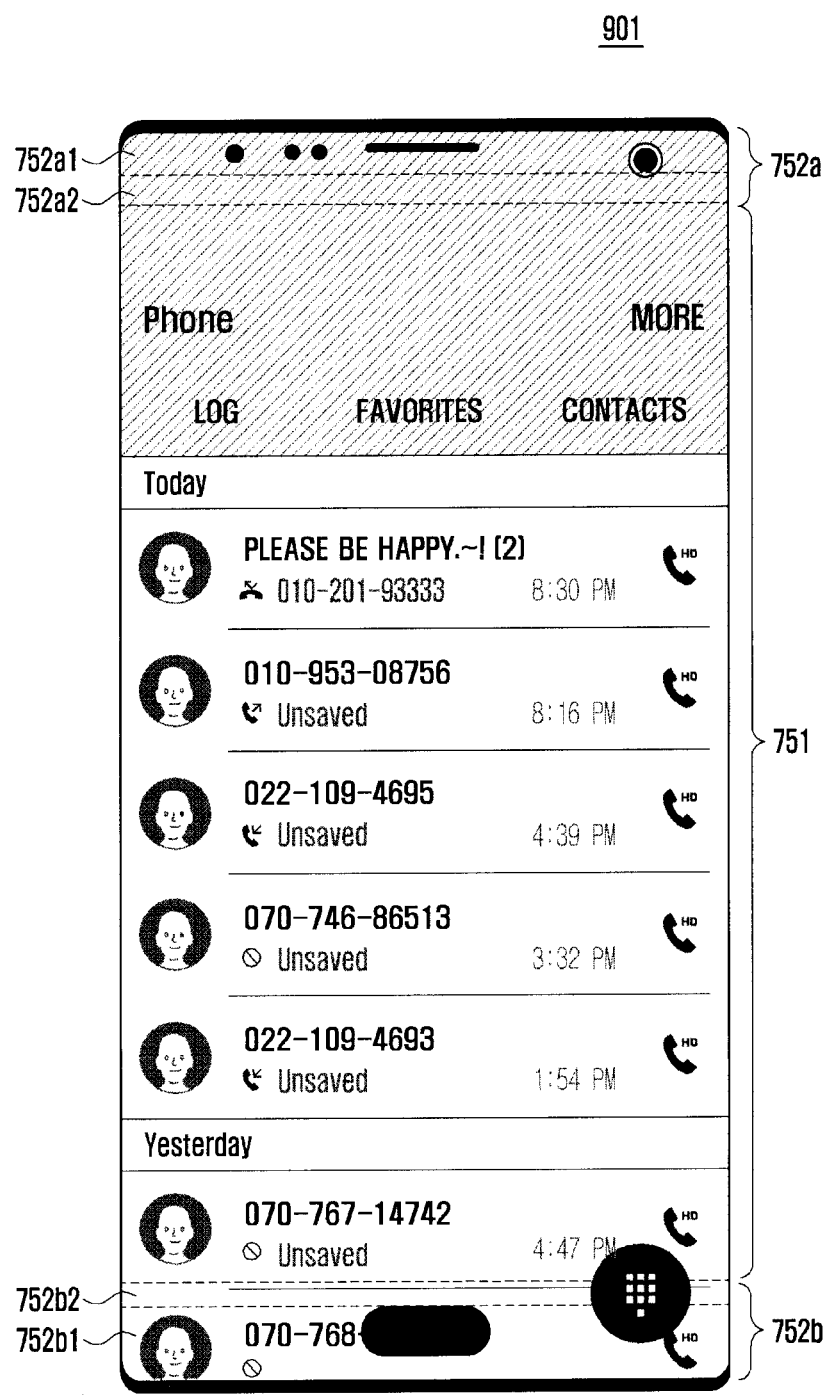

With reference to FIG. 9F, an application screen (e.g., a communication application screen 953) may be displayed on entire screens 751, 752*a*, and 752*b*.

Before analyzing a first area and a second area, the processor 210 may control to display a communication application screen 953 in the main area 751. When setup (e.g., one of interference enlargement and non-interference enlargement) does not exist, the processor 210 may control to display the communication application screen 953 in the main area 751.

The processor 210 may analyze a first area and a second area of the communication application screen 953 to determine one of interference enlargement and non-interference enlargement in the communication application screen 953. The processor 210 may enlarge interference of the communication application screen 953 according to an analysis result (e.g., threshold or less). The processor 210 may control to enlarge and display the communication application screen 953 to an entire screen according to an analysis result (e.g., threshold or less).

The application (e.g., a communication application) is an example and the present disclosure is not limited thereto and may be an application (e.g., music application, moving picture application) already installed in the electronic device 901 or an application that may be downloaded and installed in the electronic device 901.

Figure 9G:
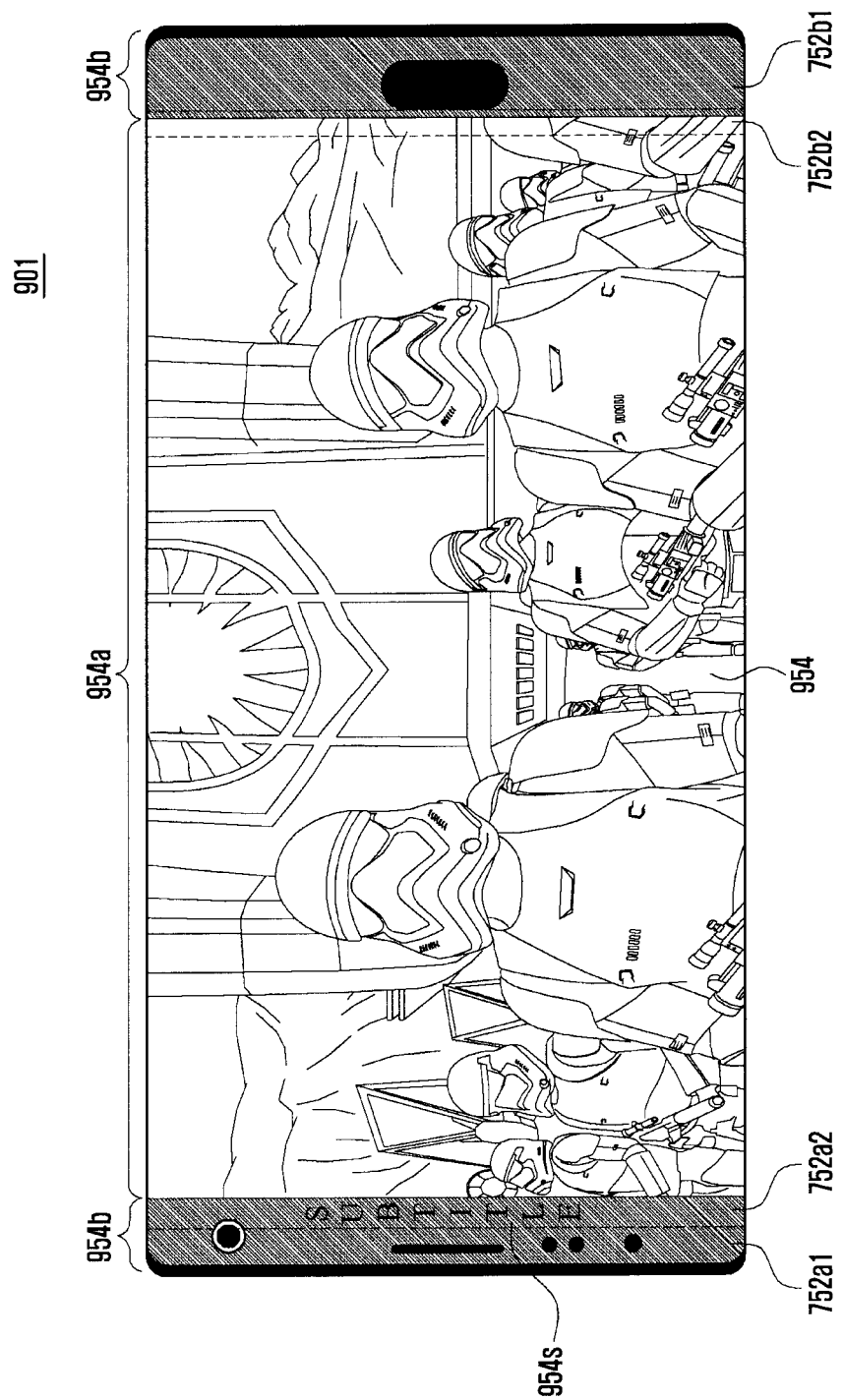
Figure 9I:
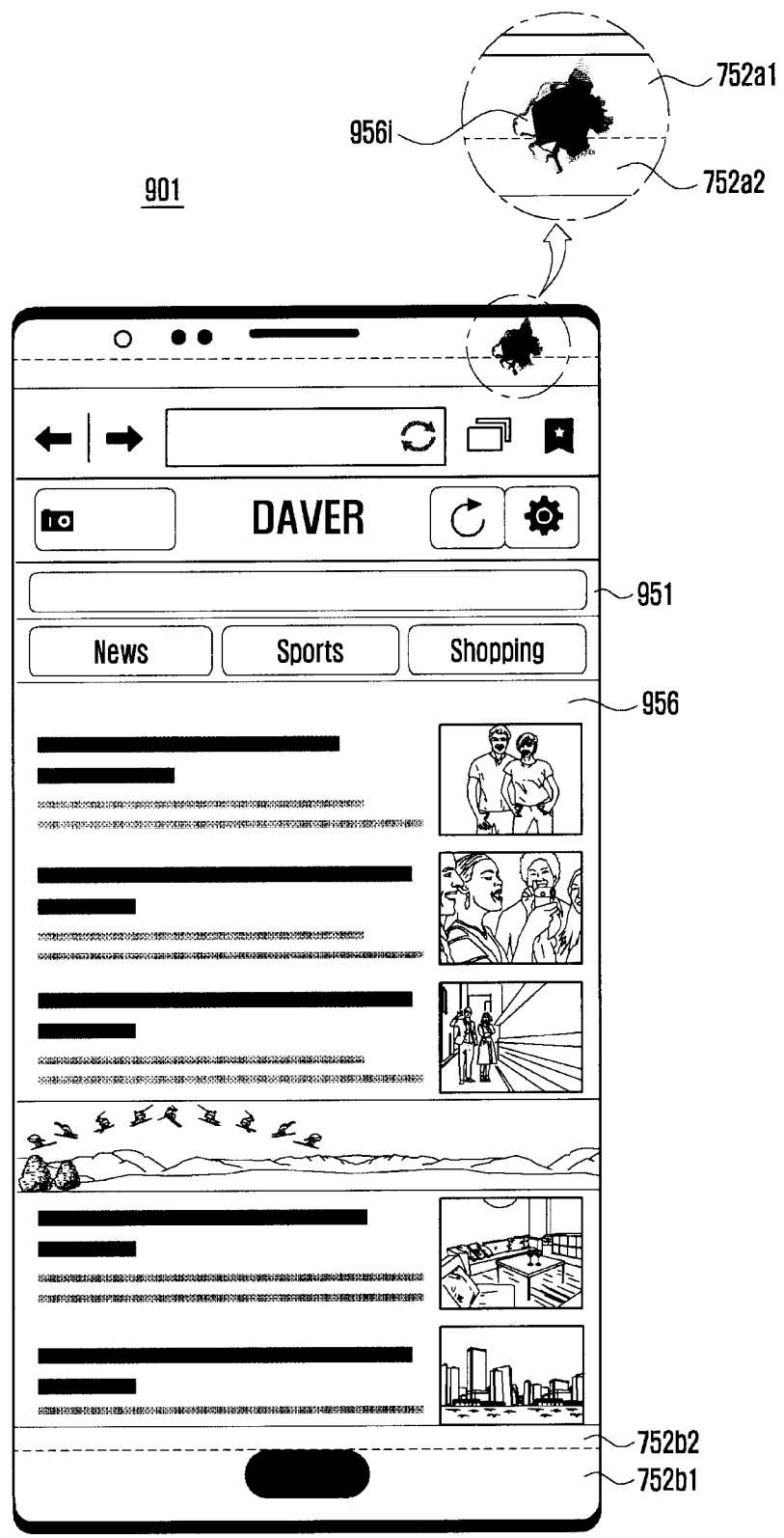
Figure 9J:
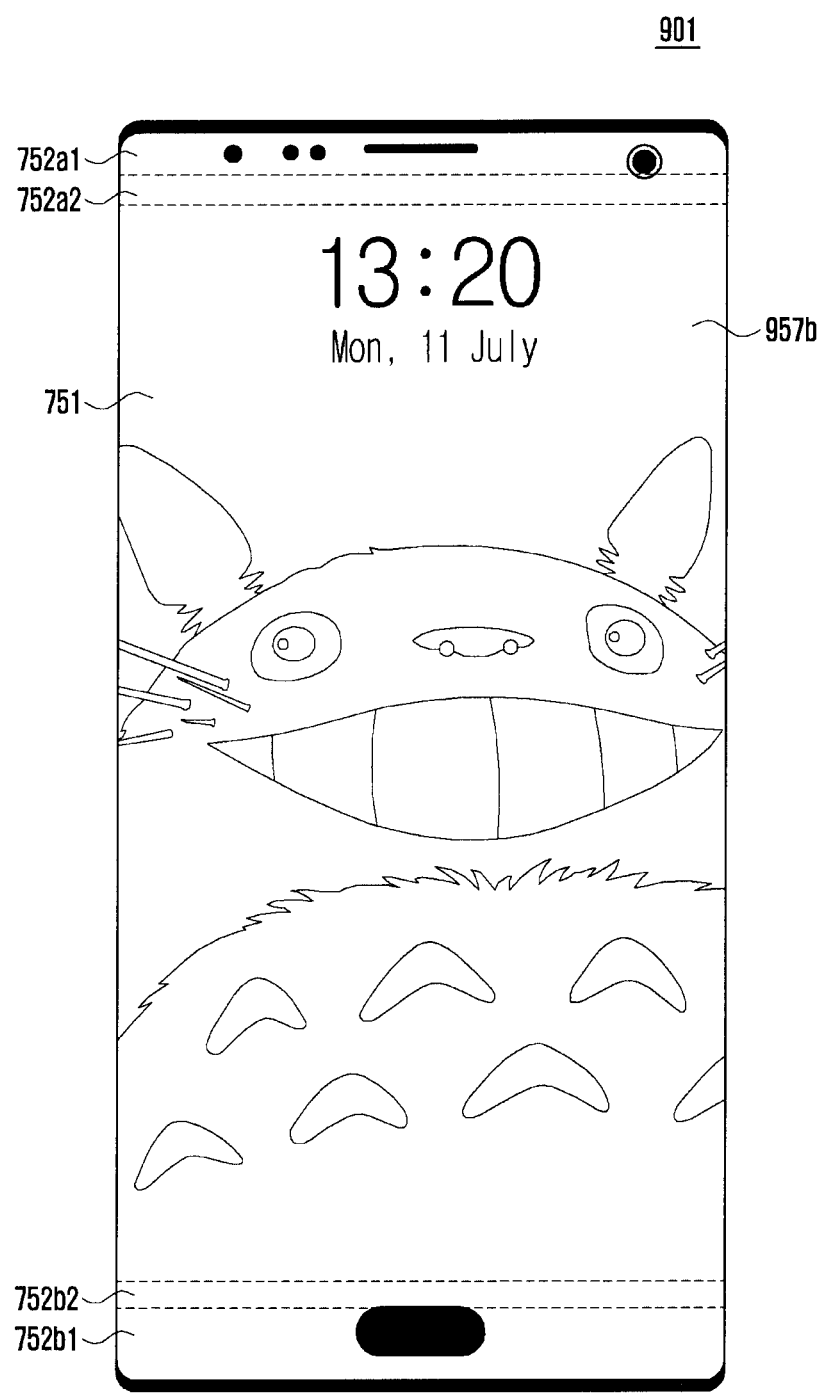
Figure 9K:
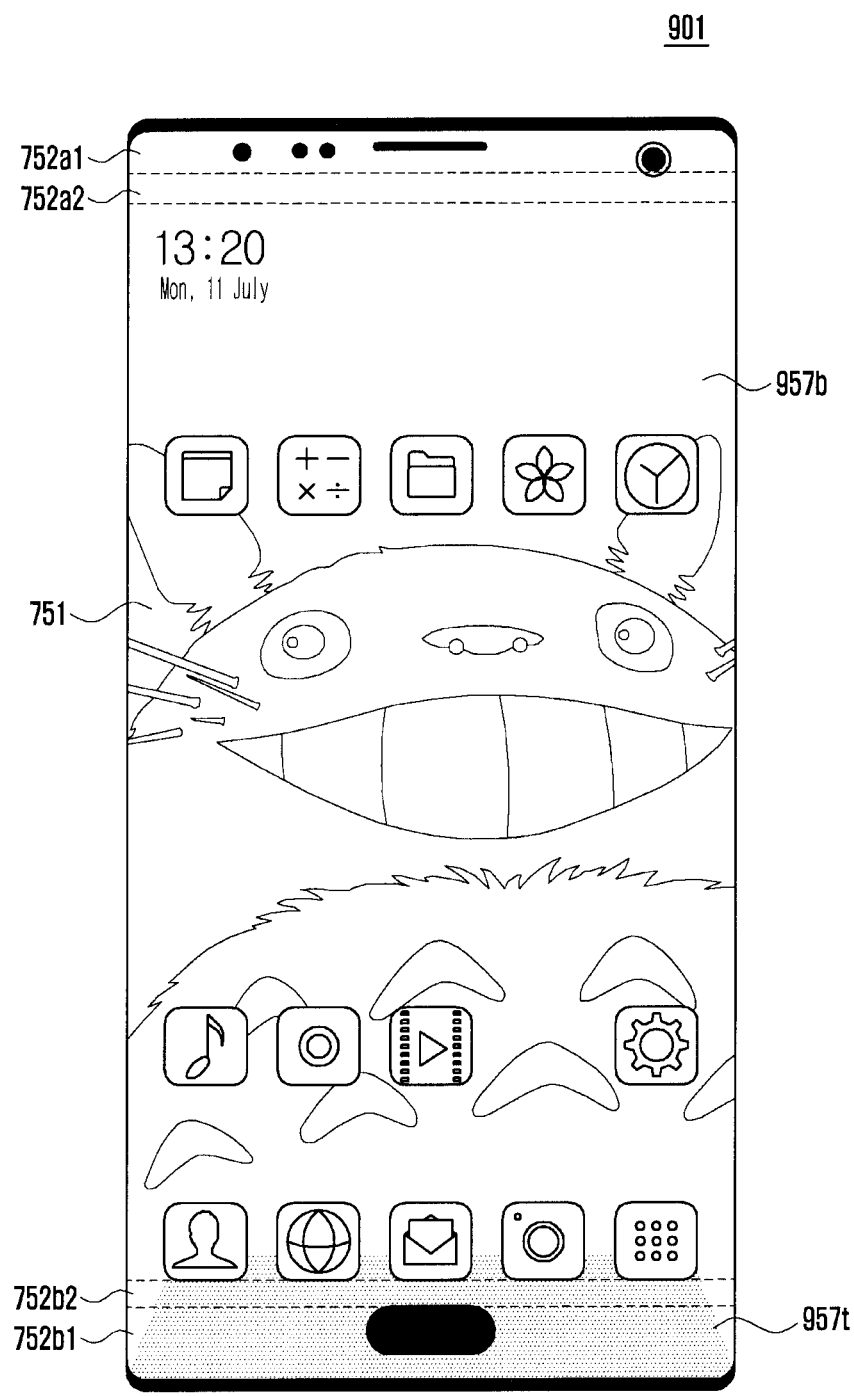

FIGS. 9J and 9K illustrate an example of an image enlarged on an entire screen.

FIG. 9I illustrates, for example, a lock screen. In the lock screen, an image 957*a* may be enlarged and displayed on entire screens 951, 952*a*, and 952*b*. The processor 210 may control to enlarge and display the image 957*a* on the entire screens 951, 952*a*, and 952*b* according to an analysis result (e.g., threshold or less).

FIG. 9K illustrates, for example, a home screen. In the home screen, an image 957*b* may be enlarged and displayed on entire screens 951, 952*a*, and 952*b*. The processor 210 may control to enlarge and display the image 957*b* on the entire screens 951, 952*a*, and 952*b* according to an analysis result (e.g., threshold or less). The processor 210 may enable a shortcut and a tray 957*t* displayed behind the shortcut to be positioned on a home screen without interference by a hole, opening, or cut out portion of the front surface.

The tray 957*t* may have transparency (e.g., 60-80%, may be changed by setup). Further, the tray 987*t* may be displayed with a color distinguished from the shortcut and the enlarged image 957*b*.

At step 850 of FIG. 8, when an enlarged image is displayed on an entire screen, a process of a method of controlling a hole area of an electronic device is terminated.

At step 840, if an entire image is not enlarged (e.g., image partial enlargement), the process continues at step 860.

At step 860, a partially enlarged image is displayed on the entire screen.

With reference to FIG. 9D, the processor 210 may control to enlarge and display an image (e.g., 951-10) in a partial area of the entire screen. The processor 210 may control to enlarge and display the image 951-10 in a partial area of the entire screen according to an analysis result. The partial area of the entire screen may mean the main area 751 and the first extension area 752a or the main area 751 and the second extension area 752b. A size of the partial area of the entire screen may be 1440×2776 pixels.

In an example embodiment, an added partial area of the entire screen may further include one of the extension area 752a2 and the extension area 725b2. The processor 210 may control to enlarge and display the image (e.g., 951-10) in an added partial area of the entire screen.

The added partial area of the entire screen may include the main area 751, the first extension area 752a, and the extension area 752b2. Further, the added partial area of the entire screen may include the main area 751, the second extension area 752b, and the extension area 752a2. A size of the partial area of the entire screen according to an example embodiment may be 1440×2856 pixels.

A size of a partial area of the entire screen may be changed according to a screen size and/or an aspect ratio of the electronic device 901. Further, a size of the added partial area of the entire screen may be changed according to a screen size and/or an aspect ratio of the electronic device 901.

At step 860 of FIG. 8, when an enlarged image is displayed in a partial area (or an added partial area of the entire screen) of the entire screen, a process of a method of controlling a hole area of an electronic device is terminated.

At step 830, if "image interference" enlargement is not utilized (e.g., image non-interference enlargement), the process continues at step 870.

At step 870, enlargement of the image using "non-interference" enlargement is determined.

The processor 210 may determine whether to enlarge image non-interference. Enlargement of the image using "non-interference" may mean enlargement of the image (e.g., 951-13) to the area 752a2 and the extension area 752b2 through analysis (e.g., more than a threshold) of the first area 751a1 or analysis (e.g., more than a threshold) of the second area 751a2.

When both the first area 751a1 and the second area 751a2 of the image (e.g., 951-13) are more than a threshold according to an analysis result, the processor 210 may determine whether to enlarge image non-interference.

The processor 210 may enlarge an image (e.g., 951-13) to the main area 751, the area 752a2, and the extension area 752b2 according to enlargement determination of image non-interference.

At step 870 of FIG. 8, if image "non-interference" enlargement is determined to be utilized, the process continues at step 880. If image "non-interference" enlargement is not utilized at step 870, the process continues at step 890.

At step 880, an image in which "non-interference" enlargement is applied is displayed on the entire screen.

With reference to FIG. 9E, the processor 210 may control to enlarge and display an image (e.g., 951-13) in a partial area (e.g., non-interference areas 951, 952a2, 952b2 of the entire screen. The processor 210 may enlarge and display the image 951-13 in the non-interference areas 951, 952a2, and 952b2 of the entire screen according to an analysis result. The non-interference area of the entire screen may mean the main area 751 and the first extension area 752a or the main area 751 and the second extension area 752b. A size of the non-interference area of the entire screen may be 1440×2710 pixels. A size of the non-interference area may be 90.6% of that of the entire screen.

A size of the non-interference area of the entire screen may be changed according to a screen size and/or an aspect ratio of the electronic device 901. Further, a size of the non-interference area of the entire screen may be changed according to a position and/or a size of a hole, opening, or cut out portion of a screen of the electronic device 901.

At step 880 of FIG. 8, when an enlarged image is displayed in a non-interference area of the entire screen, a process of a method of controlling a hole area of an electronic device is terminated.

At step 870, if non-interference enlargement is not utilized, the process continues at step 890.

At step 890, an image is displayed in a main area.

When interference enlargement and non-interference enlargement is not applied (or when interference enlargement and non-interference enlargement is not set) to an image, the processor 210 may control to display the image (e.g., 951-17) in the main area 751. A size of the main area of the entire screen may be 1440×2560 pixels. A size of the main area may be 85.6% of that of the entire screen.

In an example embodiment, in an executing moving picture application, a subtitle 954s may be displayed in the extension areas 752a and 752b. Further, a text (or subtitle) may be displayed at one side (e.g., the extension areas 752a and 752b) of the application screen displayed in the main area 751.

With reference to FIG. 9G, a moving picture application screen 954 may be displayed on entire screens 951, 952a, and 952b. Further, a moving picture application screen 954 may be displayed in the main area 751.

Before analyzing the first area and the second area, the processor 210 may control to display the moving picture application screen 954 in the main area 751. When setup (e.g., one of interference enlargement and non-interference enlargement) does not exist, the processor 210 may control to display the moving picture application screen 954 in the main area 751.

The processor 210 may analyze the first area and the second area of the moving picture application screen 954 and determine use of interference enlargement and non-interference enlargement of the moving picture application screen 954. The processor 210 may enlarge interference of the moving picture application screen 954 according to an analysis result (e.g., threshold or less). The processor 210 may enlarge and display the moving picture application screen 954 on an entire screen according to an analysis result (e.g., threshold or less).

The processor 210 may control to display the moving picture application screen 954 in the main area 751 according to an analysis result (e.g., more than a threshold). Further, the processor 210 may control to display the moving picture application screen 954 in the main area 751 and the extension area 752b2 according to an analysis result (e.g., more than a threshold).

The moving picture application screen 954 may include a moving picture display area 954a and a text providing area (or a subtitle area) 954b. The moving picture display area 954a may be the main area 751. The moving picture display area 954a may include a portion of the main area 751 and the first extension area 752a. The moving picture display area 954a may include a portion of the main area 751 and the second extension area 752b. Further, the moving picture display area 954a may include the main area 751, a portion of the first extension area 752a, and a portion of the second extension area 752b.

The text providing area 954b may be one or the plural. The text providing area 954b may include a portion or the entire of the first extension area 752a. The text providing area 954b may include a portion or the entire of the second extension area 752*b*. Further, the text providing area 954*b* may include a portion of the first extension area 752*a* and a portion or the entire of the second extension area 752*b*.

In an example embodiment, the processor 210 may control to display a moving picture in the moving picture display area (or main area) 954*a* and to display the subtitle 954*s* in the text providing area (or a portion of the extension area) 954*b*.

In the text providing area 954*b*, a background of the subtitle 954*s* may be black, white, or gray. Further, in the text providing area 954*b*, a background of the subtitle 954*s* may be a background of a single color or a background of a plurality of colors. In the text providing area 954*b*, a color of the subtitle 954*s* should be distinguished from the background.

A direction (or flow) of the subtitle 954*s* may be determined to correspond to a direction of the electronic device 901. For example, when a direction of the electronic device 901 is landscape, a direction of the subtitle 954*s* may be portrait. Further, when a direction of the electronic device 901 is portrait, a direction of the subtitle 954*s* may be landscape.

In the text providing area 954*b*, the subtitle 954*s* may be displayed in a partial area (e.g., the extension area 752*b*2 that is not interfered by a hole, opening, or cut out portion). In the text providing area 954*b*, the subtitle 954*s* may be displayed in a partial area (e.g., the extension area 752*a*2 or the extension area 752*b*2).

In an example embodiment, a text (e.g., alarm (or notification)) 955*t* may be displayed at one side (e.g., the extension areas 752*a* and 752*b*) of an application screen displayed in the main area 751.

With reference to FIG. 9H, the main area 751 may be displayed on an executed application screen (e.g., web browser) 955.

The processor 210 may analyze a first area and a second area of the application screen 955 to determine one of interference enlargement and non-interference enlargement of the application screen 955.

The processor 210 may control to display the application screen 955 in the main area 751 according to an analysis result (e.g., more than a threshold).

Separately from the application screen, the text 955*t* corresponding to alarm (or notification) may be displayed in the extension area 752*a* or 752*b*. The processor 210 may control to display the text 955*t* corresponding to alarm (or notification) in the extension area 752*a* or 752*b*.

When displaying the text 955*t* in the extension area 752*a* or 752*b*, the processor 210 may gradually move (e.g., a direction of an arrow 955*a*) the text 955*t* corresponding to alarm (or notification). When displaying the text 955*t* in the extension area 752*a* or 752*b*, the processor 210 may control to display the text 955*t* corresponding to alarm (or notification) to avoid (e.g., non-interference) a position of a hole, opening, or cut out portion. Further, when displaying the text 955*t* in the extension area 752*a* or 752*b*, the processor 210 may gradually move (e.g., a direction of the arrow 955*a*) the text 955*t* corresponding to alarm (or notification) to avoid (e.g., non-interference) a position of a hole, opening, or cut out portion.

In an example embodiment, at one side (e.g., the extension areas 752*a* and 752*b*) of an application screen displayed in the main area 751, an image (or symbol, icon) 956*i* may be displayed.

With reference to FIG. 9I, the executed application screen (e.g., web browser) 955 may be displayed in the main area 751. The processor 210 may analyze a first area and a second area of an application screen 956 and determine one of interference enlargement and non-interference enlargement of the application screen 956. The processor 210 may control to display the application screen 956 in the main area 751 according to an analysis result (e.g., more than a threshold).

Separately from the application screen, at a position of the hole, opening, or cut out portion of the extension area 752*a* or 752*b*, an image 956*i* corresponding to masking may be displayed. The processor 210 may control to display the image 956*i* corresponding to masking in at least one of the first extension area 752*a* and the second extension area 752*b* at a position of the opening or the cut out portion. The image 956*i* is an example of an image corresponding to the camera (or camera hole) 730. A size of the image 956*i* may be greater than that of the camera (or camera hole) 730. Further, the image 956*i* should have a size to cover the camera (or camera hole) 730.

It may be easily understood to a person of ordinary skill in the art that various images corresponding to positions 720 to 740 or 631 of the hole, opening, or cut out portion of FIG. 7 as well as the foregoing image exist.

At step 890 of FIG. 8, when an image is displayed in a main area of the entire screen, a process of a method of controlling a hole area of an electronic device is terminated.

Figure 10:
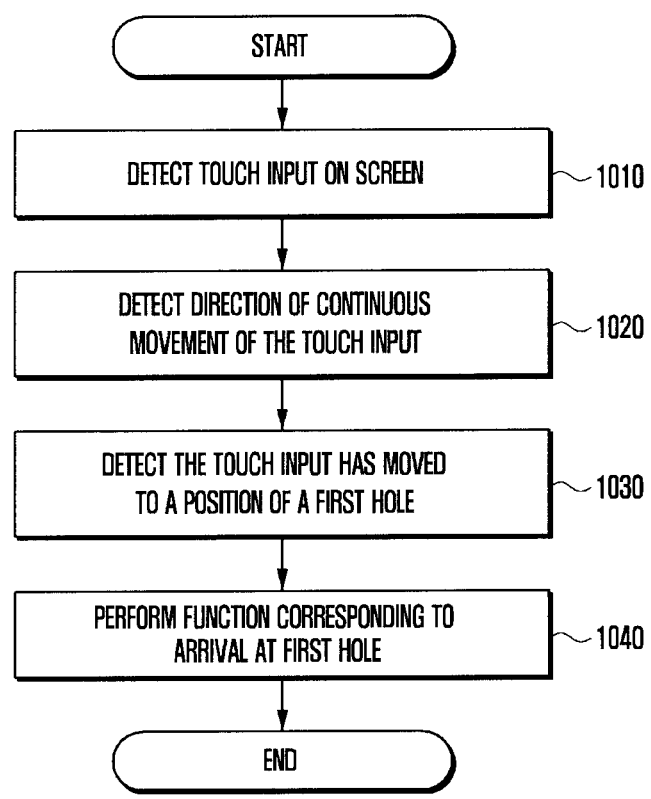
FIG. 10 is a flowchart illustrating a method of controlling an electronic device according to another example embodiment.

FIG. 10 is a flowchart illustrating a method of controlling an electronic device according to an example embodiment, and FIGS. 11A to 11F are diagrams illustrating a method of controlling an electronic device according to an example embodiment.

At step 1010 of FIG. 10, a touch input is detected on a screen.

Figure 11A:
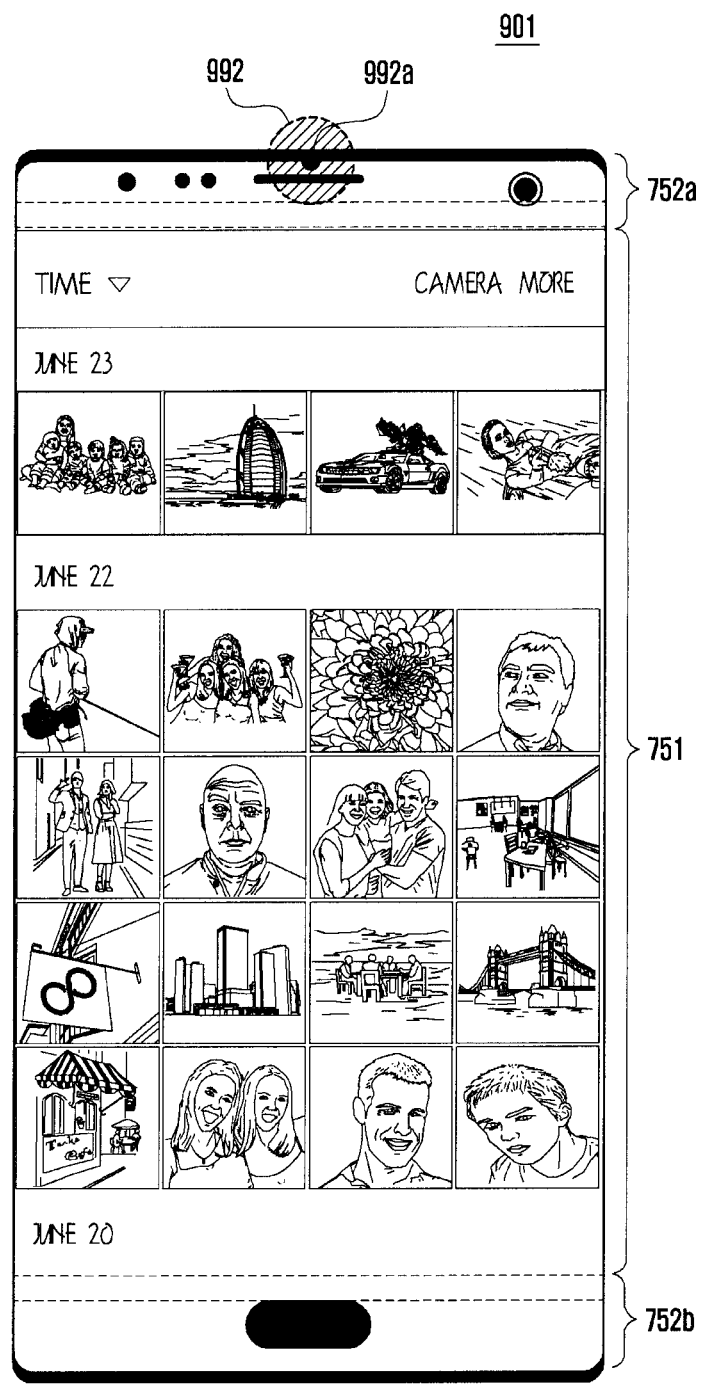
Figure 11B:
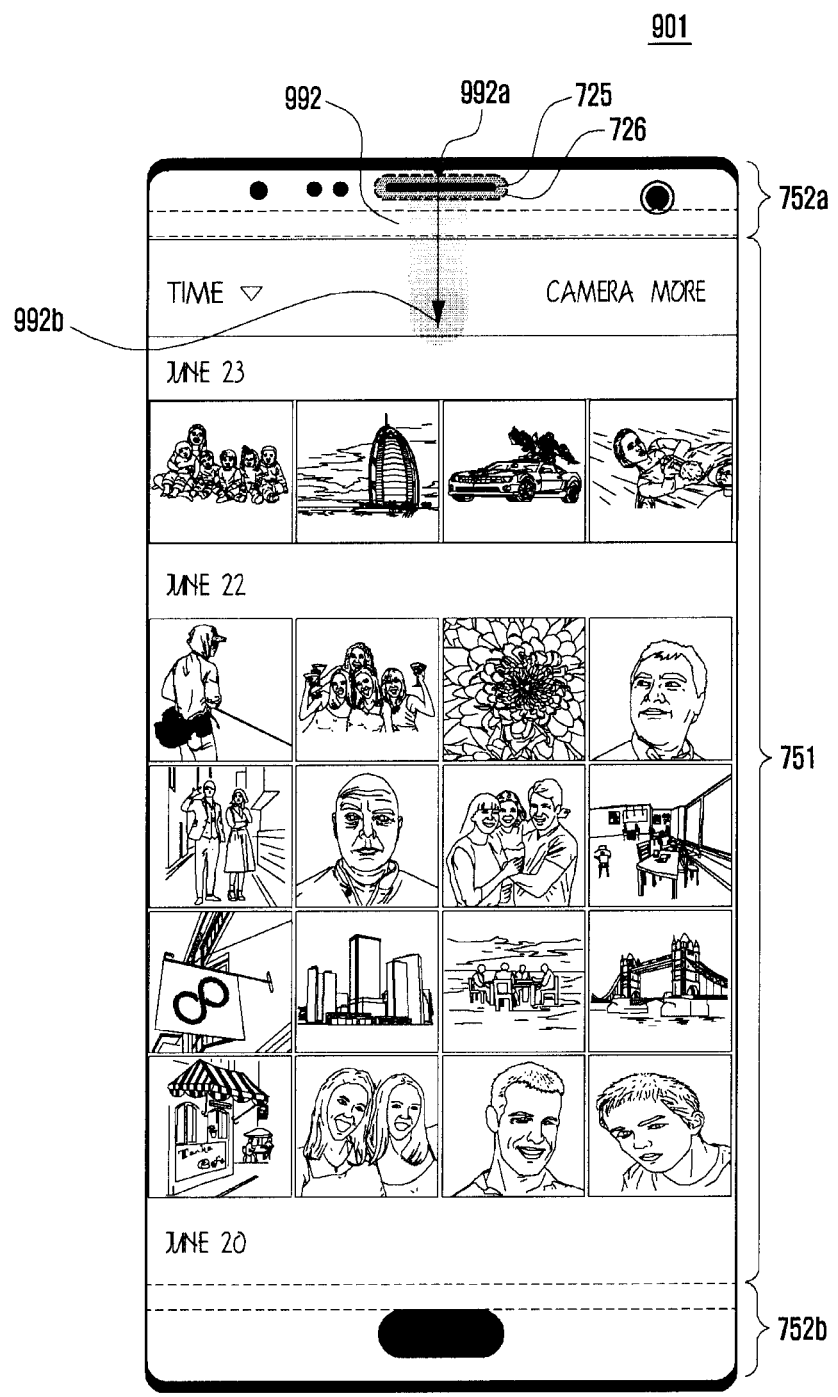
Figure 11C:
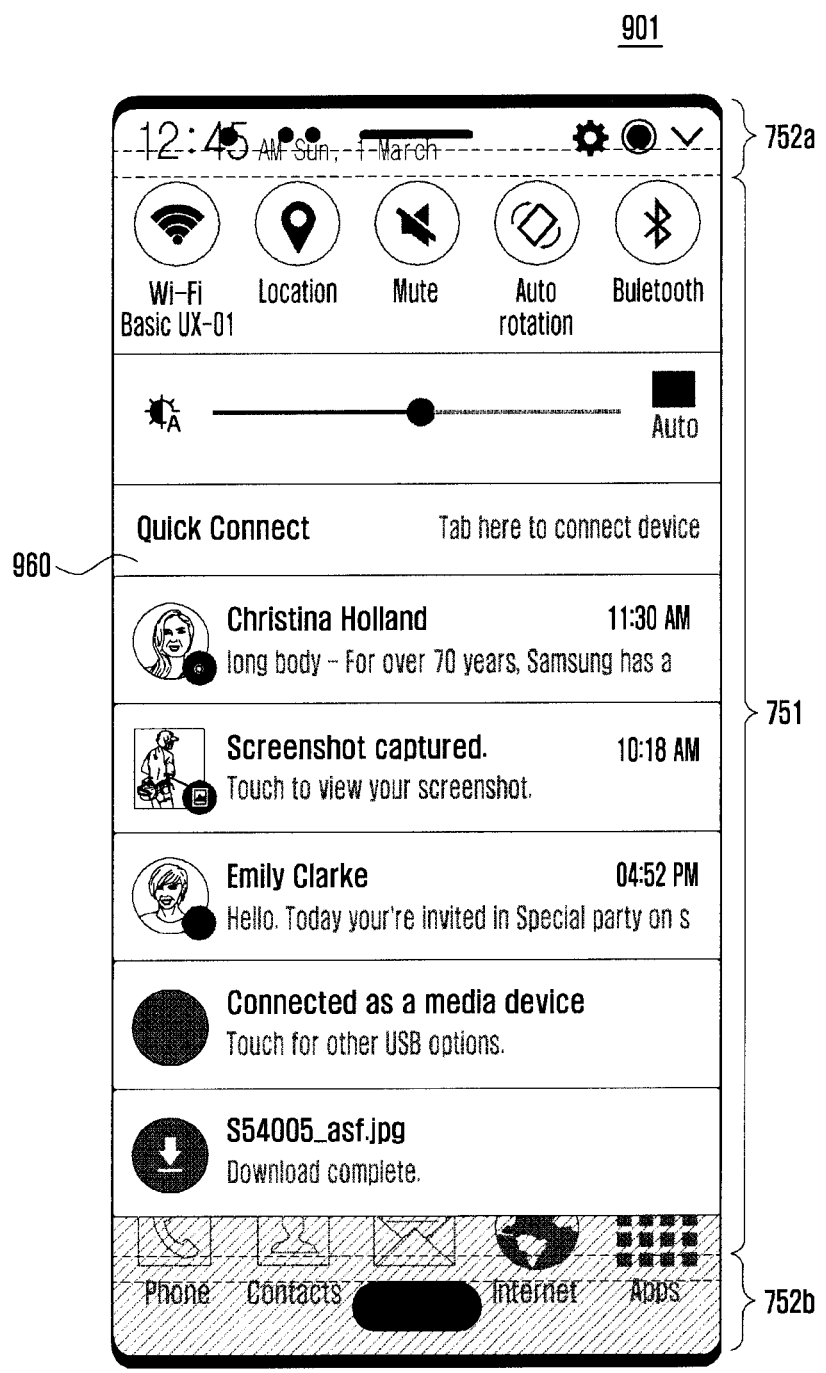
Figure 11D:
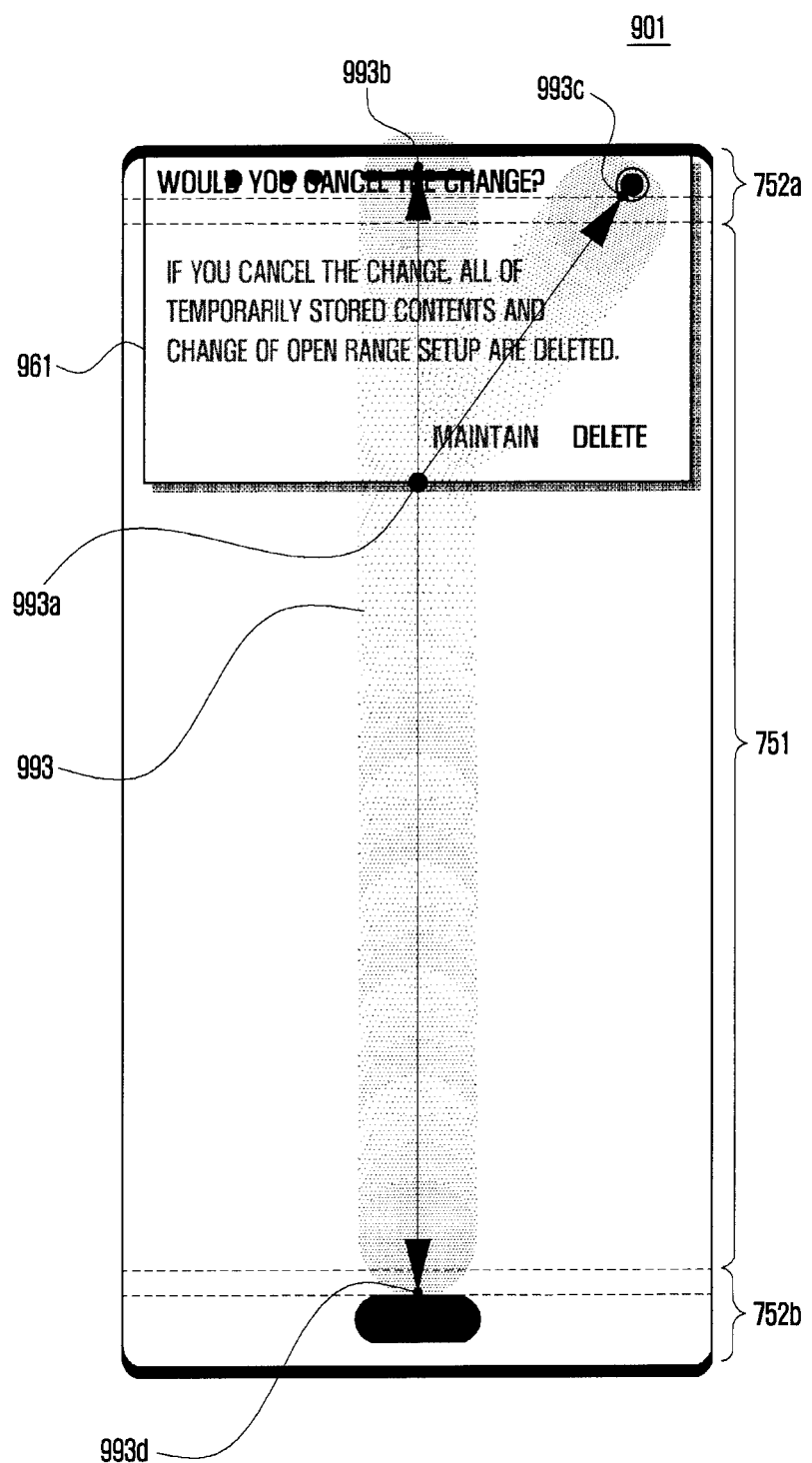
Figure 11E:
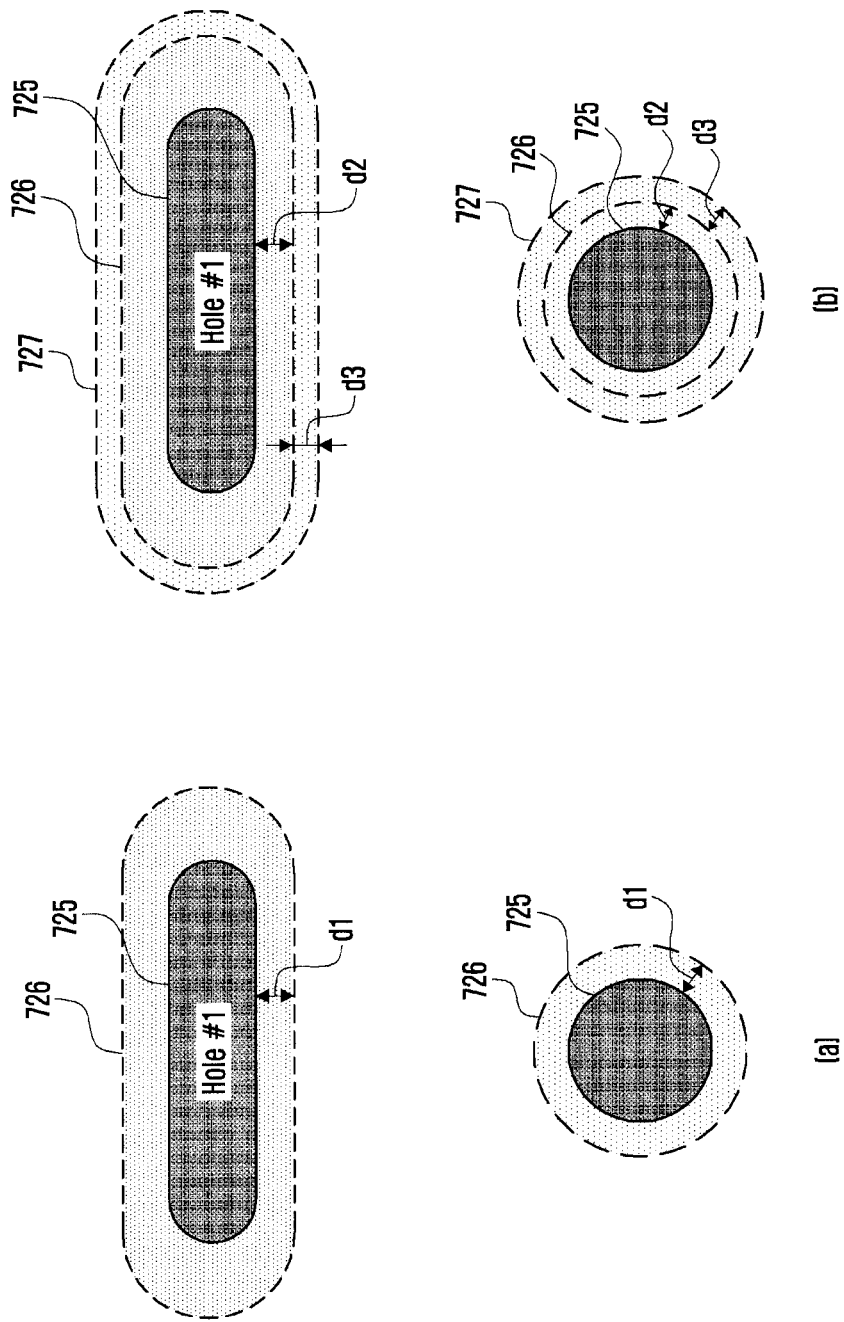

With reference to FIGS. 11A and 11E, in the display 950 of the electronic device 901, a user input (e.g., touch or hovering) 992 is received. The user input 992 may be detected as a first extension area 952*a* of the display 950 of the electronic device 901. Further, the user input 992 may be detected in the first extension area 952*a* continued from the main area 751 in which an application (e.g., a photo application) is displayed.

With reference to FIG. 11E, the user input 992 may be received in an outer edge area 726 of a first hole (camera, or camera hole) 725. The first hole 725 may correspond to an opening or cut out portions 720 to 740 or 631. For example, when the first hole is a camera (or a camera hole), a second hole may correspond to an optical sensor.

In FIG. 11E, a gap d1 between the outer edge area 726 and the first hole (camera or camera hole) 725 may be 2.5 mm. Further, a gap d1 between the outer edge area 726 and the first hole (camera or camera hole) 725 may be 1 mm≤d1≤18 mm. The gap d1 is an example and may be changed.

In FIG. 11E, a gap d2 between the first outer edge area 726 and the first hole (camera or camera hole) 725 may be 2.5 mm. A gap d3 between the first outer edge area 726 and the second outer edge area 727 may be 2.0 mm. A gap d2 between the first outer edge area 726 and the first hole (camera or camera hole) 725 may be 1 mm≤d1≤10 mm. Further, a gap d3 between the first outer edge area 726 and the second outer edge area 727 may be 1 mm≤d1≤8 mm. A precisely used input may be detected by the first outer edge area 726 and the second outer edge area 727. The gaps d2 and d3 are an example and may be changed.

The application (e.g., photo application) is an example and should be an application (e.g., web browser) that may be executed or installed in the electronic device 901.

The processor 210 may detect the user input 992 using the panel 262. The processor 210 may calculate a user input position (e.g., X11 coordinate and Y11 coordinate) 992a corresponding to the user input 992 using an electric signal received from the panel 262.

The processor 210 may store the user input position 990a, a touch detection time (e.g., 11:16 AM) of a detected touch, and touch information corresponding to the touch at the memory 230.

At step 1020 of FIG. 10, a direction of a continuous movement of the touch input is detected.

With reference to FIG. 11B, a continuous movement of a user input (e.g., touch or hovering) 992 is received in the display 950 of the electronic device 901.

The processor 210 may detect continuous movement (e.g., a plurality of X coordinates and Y coordinates corresponding to a continuous touch) of the user input 992 using the panel 262. The processor 210 may calculate continuous movement positions (e.g., a plurality of X coordinates and a plurality of Y coordinates) 992a and 992b of an user input corresponding to the user input 992 using an electric signal received from the panel 262.

At the first outer edge area 726, a continuous movement (e.g., a movement from an initial position 992a to a final position 992b) of the user input 992 may indicate a touch gesture input to the display 750. At the first outer edge area 726, a continuous movement (e.g., a movement from the initial position 992a to the camera (or the camera hole) 725) of the user input 992 may mean a touch gesture input to the display 750. At the first outer edge area 726, a continuous movement (e.g., a movement from the initial position 992a to the outer edge area 726 via the camera (or the camera hole) 725) of the user input 992 may mean a touch gesture input to the display 750. Further, in the first outer edge area 726, a continuous movement (e.g., a movement from the initial position 992a to the first outer edge area 726 via the camera (or the camera hole) 725) of the user input 992 may mean a touch gesture input to the display 750.

A touch gesture of the display 750 may include swipe, drag, or flick using the position 992a of the user input 992 as an initial position.

The processor 210 may determine a direction of a continuous movement of the user input using a continuous movement position of a stored user input. In FIG. 11B, the processor 210 may determine a direction of a continuous movement of the user input to a direction of the first hole 725.

At step 1030 of FIG. 10, the processor 210 may detect that the touch input has moved to a position corresponding to the first hole 725.

With reference to FIG. 11B, a continuous movement of the user input arrives at the first hole 725. Further, a continuous movement of the user input may pass through the first hole 725. The processor 210 may determine that a continuous movement of the user input arrives at the first hole 725 using a continuous movement position of a stored user input.

At step 1040 of FIG. 10, a function corresponding to arrival at the first hole may be executed (e.g., responsive to the arrival of the touch input at the corresponding location).

With reference to FIG. 11C, the processor 210 may execute a quick panel when detecting arrival of the continuous movement of the user input at the first hole 725. However, it is noted the processor 210 may be configured to perform any function (e.g., call of the quick panel 960) in response to detecting arrival of a continuous movement of the user input at the first hole 725. The processor 210 may perform a function (e.g., execution of a preset panel which is not shown) in response to detecting arrival of a continuous movement of the eleventh user input at the first hole 725. Execution of the quick panel 960 may include a execution of a preset panel (which is not shown).

The processor 210 may further perform a function responsive to arrival of a continuous movement of the user input at any hole (e.g., an "n-th" hole). The processor 210 may perform a preset function at the n-th hole responsive to arrival of a continuous movement of the user input at the n-th hole.

For example, when a second hole 730 is a camera or a camera hole, the processor 210 may perform a screenshot function or camera function responsive to arrival of a continuous movement of the user input at the second hole 730. When a third hole 725 is a receiver or a receiver hole, the processor 210 may perform voice recording or "S voice" accessibility (e.g., vocal recognition based data retrieval or execution) responsive to arrival of a continuous movement of the user input at the third hole 725. Further, when a fourth hole 740 is a fingerprint sensor (or a home button) hole, the processor 210 may perform one function of fingerprint recognition and Samsung pay to correspond to arrival of a continuous movement of the user input at the fourth hole 740.

In an example embodiment, a function corresponding to the n-th hole may be implemented with reception of the user input at the n-th hole as well as arrival of a continuous movement of the user input at the n-th hole.

In an outer edge area 726, a first outer edge area 726, and a second outer edge area 727 of the n-th hole implemented as shown in FIG. 11E(a) or 11E(a), when the user input is detected, the processor 210 may perform a function corresponding to the n-th hole.

In an example embodiment, an application screen (e.g., web browser) is displayed on entire screens 751, 752a, and 752b.

With reference to FIG. 11D, at the upper end (e.g., including a portion of the first extension area 752a) of the screen, head-up notification 961 may be displayed. Further, in a main area of the screen, the head-up notification 961 may be displayed.

The processor 210 may perform a function responsive to arrival of a continuous movement of a user input at the hole. The hole may be, for example, the receiver hole 725, the camera hole 730, and the fingerprint sensor hole 740. The hole may further include an optical sensor hole 720. Further, the hole may include a front hole or a rear hole (e.g., rear camera hole, LED hole) of the electronic device 901.

The user input 993 is generated at the head-up notification 961 by the user. The user may input a continuous movement from an initial position 993a to a final position (e.g., 993b, 993c, or 993d).

The processor 210 may perform a function responsive to arrival of a continuous movement (e.g., from the initial position 993a to the final position (e.g., 993b, 993c or 993d of the detected user input 993.

When the user input 993 arrives at the hole, the operations are substantially similar (e.g., the difference between user inputs) to arrival of a continuous movement of the user input at the first hole; therefore, a detailed description thereof will be omitted.

A function corresponding to arrival of a continuous movement of the user input 993 at the hole in the head-up notification 961 may include holding of head-up notification (from the initial position 993a to the final position 993b), deletion of head-up notification (from the initial position 993a to the final position 993c), or storage of head-up notification (from the initial position 993a to the final position 993d). The function is understood to be merely an example and describes an example function provided from the electronic device 901.

In an example embodiment, visual feedback 995a to 995f are provided, corresponding to a continuous movement (or a user input) of a user input.

With reference to FIGS. 11F(a) to 11F(c), the processor 210 may provide visual feedback 995a to 995c corresponding to a continuous movement of the received user input.

The visual feedback 995a to 995c may be displayed corresponding to a direction or a trajectory of a continuous movement of a user input. The visual feedback 995a to 995c may be displayed using a shape (e.g., circle, oval) of a hole corresponding to an initial position of a received user input. Further, the visual feedback 995a to 995c may be displayed to correspond to a direction or a trajectory of a continuous movement of a user input, using for example, a color and brightness added to a shape (e.g., circle, oval) of a hole corresponding to an initial position of a received user input.

With reference to FIGS. 11F(d) to 11F(f), the processor 210 may provide visual feedback 995e to 995f corresponding to a received user input.

The visual feedback 995e to 995f may be displayed to correspond to a position of the received user input. The visual feedback 995e to 995f may be displayed using a shape (e.g., circle, oval) of a hole corresponding to a position of the received user input. Further, the visual feedback 995e to 995f may be displayed to gradually enlarge using a color and brightness added to a shape (e.g., circle, oval) of a hole corresponding to an initial position of the received user input.

At step 1040 of FIG. 10, when a function is executed responsive to detecting arrival of the user input at the first hole, a process of a method of controlling a hole area of an electronic device is terminated.

A method of controlling a hole area of an electronic device having at least one hole area in a display according to an example embodiment of the present disclosure includes operations of selecting a displayed content; determining one of interference enlargement and non-interference enlargement through edge analysis of the content; and enlarging the content by one of the interference enlargement and the non-interference enlargement, such that the hole area is formed by one of a camera, receiver, optical sensor, and home button.

In an example embodiment, the display may include a main area and an extension area, and the hole area may be positioned at the extension area.

In an example embodiment, the extension area may be distinguished into a first extension area positioned at an upper end portion of the main area and a second extension area positioned at a lower end portion of the main area.

In an example embodiment, the first extension area may be distinguished into an extension area in which one hole area of the hole areas is positioned and a extension area positioned at a low end portion of the extension area.

In an example embodiment, the second extension area may be distinguished into an extension area in which another one hole area of the hole areas is positioned and an extension area positioned at an upper end portion of the extension area.

In an example embodiment, the main area may be distinguished into a first area connected to the first extension area and a second area connected to the second extension area, and edge analysis of the content may include edge analysis of the content corresponding to the first area and edge analysis of the content corresponding to the second area.

In an example embodiment, the interference enlargement may be enlargement that limits enlargement of the content by the hole area, and the non-interference enlargement may be enlargement that does not limit enlargement of the content by the hole area.

In an example embodiment, the interference enlargement may be to enlarge and display the content in an interference area of the display, and the interference area of the display may include the main area and the extension area.

In an example embodiment, the interference enlargement may limit the display of a partial area of the content enlarged by the hole area.

In an example embodiment, the non-interference enlargement may be to enlarge and display the content in a non-interference area of the display, and the non-interference area of the display may include the main area and a partial area of the extension area.

In an example embodiment, an area of the first extension area and an area of the second extension area may be different.

In an example embodiment, an area of the extension area and an area of the extension area may be different.

In an example embodiment, an area of the extension area and an area of the extension area may be different.

In an example embodiment, an area of the extension area may be greater than that of one area of the first area and the second area.

In an example embodiment, one hole area may be positioned in the first extension area to correspond to the camera.

In an example embodiment, the hole area may include one of a hole, opening, and cut out portion.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific IC (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc ROM (CD-ROM) and DVD; magneto-optical media, such as floptical disks; and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

A method for adjusting a camera exposure in an electronic device according to various embodiments of the present disclosure can identify an exposure state of a partial area selected by a user from the whole area of a preview image, and provide a screen for adjusting an exposure correctly based on the identification result of the exposure state.

While the present disclosure has been shown and described with reference to various embodiments thereof, it will be understood by those skilled in the art that various changes in form and details may be made therein without departing from the present disclosure as defined by the appended claims and their equivalents.

According to various example embodiments of the present disclosure, by providing an electronic device having a hole area and a method of controlling a hole area thereof that can enlarge a content through a display having a main area and an extension area, natural screen usability can be provided to a user.

What is claimed is:

1. An electronic device, comprising:
a housing including a first surface facing a first direction and a second surface facing a second direction opposite to the first direction;
a touch screen display disposed between the first surface and the second surface such that a portion of the touch screen display is exposed through the first surface, the touch screen display including a main area and an extension area, the extension area including at least one opening; and
a processor electrically coupled to the touch screen display, configured to:
detect selection of a content to be displayed on the touch screen display;
determined whether a characteristic of a portion of the selected content corresponding to an edge area of the main area disposed along a boundary between the main area and the extension area is equal to or less than a threshold;
display the selected content on the main area when the characteristic is greater than the threshold, and
display the selected content on an area combining the main area and the extension area when the characteristic is equal to or less than the threshold, wherein an enlarged view of the portion of the selected content corresponding to the edge area of the main area is displayed from the edge area to the extension area.

2. The electronic device of claim 1, wherein the extension area includes at least one of a first extension area along a too edge of the main area and a second extension area disposed along a bottom edge of the main area.

3. The electronic device of claim 2, wherein the first extension area or the second extension area includes a first sub-area and a second sub-area,
wherein the first sub-area is disposed between the edge area and the second sub-area, and
wherein the second sub-area includes the at least one opening.

4. The electronic device of claim 3,
wherein an enlarged view of the portion of the selected content corresponding to the edge area of the main area is displayed from the edge area to the first sub-area, or
wherein an enlarged view of the portion of the selected content corresponding to the edge area of the main area is displayed from the edge area to the second sub-area.

5. The electronic device of claim 1, the characteristic is associated with pixels of the selected content disposed outside the extension area.

6. The electronic device of claim 5, the characteristic includes a difference between a first pixel of the selected content to a second pixel of the selected content, the first and second pixels disposed outside the extension area.

7. A method in an electronic device, comprising:
defining a main area and an extension area of a touch screen display of the electronic device;
detecting selection of a content to be displayed on the touch screen display;
determining whether a characteristic of a portion of the selected content corresponding to an edge area of the main area disposed along a boundary between the main area and the extension area is equal to or less than a threshold;
displaying the selected content on the main area when the characteristic is greater than the threshold; and
displaying the selected content on an area combining the main area and the extension area when the characteristic equal to or less than the threshold, wherein an enlarged view of the portion of the selected content corresponding to the edge area of the main area is displayed from the edge area to the extension area.

8. The method of claim 7, wherein the touch screen display includes at least one hole formed in the extension area.

9. The method of claim 8, wherein the extension area includes at least one of a first extension area disposed along a top edge of the main area and a second extension area disposed along a bottom edge of the main area.

10. The method of claim 9, wherein the first extension area or the second extension area includes a first sub-area and a second sub-area,
wherein the first sub-area is disposed between the edge area and the second sub-area, and
wherein the second sub-area includes the at least one opening.

11. The method of claim 9, wherein the edge area includes at least one of a first edge area adjacent to the first extension area and a second edge area adjacent to the second extension area.

12. The method of claim 10, wherein an enlarged view of the portion of the selected content corresponding to the edge area of the main area is displayed from the edge area to the first sub-area.

13. The method of claim 10, wherein an enlarged view of the portion of the selected content corresponding to the edge area of the main area is displayed from the edge area to the second sub-area.

14. The method of claim 9, wherein the first extension area and the second extension area include different areas of the touch screen display, respectively.

15. The method of claim 10, wherein the first sub-area and the second sub-area include different areas of the touch screen display, respectively.

16. The method of claim 11, wherein a dimensional area of the extension area is greater than a dimensional area of at least one of the first edge area and the second edge area.

17. The method of claim 8, wherein a location of the at least one hole on the touch screen display corresponds to a location of a camera disposed within the electronic device.

18. The method of claim 7, wherein the at least one hole comprises one of an opening and exsectile portion defined in a transparent pane covering a portion of the touch screen display exposed through a surface of the electronic device.

19. The method of claim 12, the characteristic is associated with pixels of the selected content disposed outside the extension area.

20. The method of claim 19, the characteristic includes a difference between a first pixel of the selected content to a second pixel of the selected content, the first and second pixels disposed outside the extension area.

* * * * *